United States Patent
Ing et al.

(10) Patent No.: US 10,870,368 B2
(45) Date of Patent: Dec. 22, 2020

(54) SYSTEMS AND METHODS OF BATTERY THERMAL MANAGEMENT

(71) Applicant: NIO USA, Inc., San Jose, CA (US)

(72) Inventors: Adam H. Ing, San Francisco, CA (US); Yadunandana Yellambalase, Mountain View, CA (US); Rick Rajaie, Rochester Hills, MI (US)

(73) Assignee: NIO USA, Inc., San Jose, CA (US)

( * ) Notice: Subject to any disclaimer, the term of this patent is extended or adjusted under 35 U.S.C. 154(b) by 296 days.

(21) Appl. No.: 15/954,286

(22) Filed: Apr. 16, 2018

(65) Prior Publication Data

US 2019/0315232 A1    Oct. 17, 2019

(51) Int. Cl.
| | | |
|---|---|---|
| *B60L 58/24* | (2019.01) | |
| *B60L 58/26* | (2019.01) | |
| *B60L 58/27* | (2019.01) | |

(52) U.S. Cl.
CPC ............... *B60L 58/24* (2019.02); *B60L 58/26* (2019.02); *B60L 58/27* (2019.02);
(Continued)

(58) Field of Classification Search
CPC .......... B60L 2240/545; B60L 2240/62; B60L 2240/66; B60L 2240/44; B60L 58/27; B60L 58/26; B60L 58/24; B60L 2240/00; B60L 2240/425; B60L 2240/54; B60L 2260/54; B60L 2260/56; B60W 10/24; B60W 10/26; B60W 20/00; B60W 20/1312; B60W 20/11; B60W 20/15; B60H 1/00278; Y02T 90/16; Y02T 90/163; Y02T 90/7044; Y02T 90/7005; Y02T 90/7291; Y02T 90/7038; Y02T 90/705; Y02T 90/7077; Y02T 90/72; Y02T 90/7258; Y02T 90/7275; Y02T 90/7283; G05D 23/00; G05D 23/01;
(Continued)

(56) References Cited

U.S. PATENT DOCUMENTS

| | | |
|---|---|---|
| 5,490,572 A | 2/1996 | Tajiri et al. |
| 8,676,400 B2 | 3/2014 | Tippelhofer et al. |

(Continued)

OTHER PUBLICATIONS

Notice of Allowance for U.S. Appl. No. 15/492,962, dated Jan. 3, 2019 7 pages.
(Continued)

*Primary Examiner* — Anthony R Jimenez
(74) *Attorney, Agent, or Firm* — Sheridan Ross P.C.

(57) ABSTRACT

A thermal management system of a battery of an electric vehicle proactively manages the temperature of the battery based on sensor data and sets limits to control cooling and heating of the battery. Using the data gathered from an autonomous drive platform, a highly-efficient control system which uses predictive modelling can be created. A control system predicts the battery final temperature and determines if cooling and/or heating is necessary for the route. If cooling and/or heating is not necessary, the thermal management system may be simply turned off to save energy. This is a dynamic approach which should optimize energy usage under all situations using trip predictive information (from GPS, route-calculation algorithms, and weather information), and thermal model predictive controls to determine battery final temperatures.

20 Claims, 19 Drawing Sheets

(52) U.S. Cl.
CPC ..... *B60L 2240/545* (2013.01); *B60L 2240/62* (2013.01); *B60L 2240/66* (2013.01); *B60L 2260/44* (2013.01)

(58) Field of Classification Search
CPC ............... G05D 23/19; G05D 23/1902; G05D 23/1904; H01M 2200/00; H01M 2200/10; H01M 2200/20
USPC .......................................................... 701/22
See application file for complete search history.

(56) References Cited

U.S. PATENT DOCUMENTS

| | | | |
|---|---|---|---|
| 8,731,796 B2 | 5/2014 | Norden | |
| 8,914,173 B2 | 12/2014 | Biondo et al. | |
| 9,007,027 B2 * | 4/2015 | Prosser | H02J 7/007192 320/130 |
| 9,114,794 B2 | 8/2015 | King et al. | |
| 9,457,682 B2 * | 10/2016 | Twarog | B60L 58/12 |
| 9,987,944 B2 * | 6/2018 | Dunlap | B60L 53/66 |
| 2010/0019718 A1 | 1/2010 | Salasoo et al. | |
| 2010/0072946 A1 | 3/2010 | Sugano | |
| 2012/0029724 A1 | 2/2012 | Formanski et al. | |
| 2013/0116877 A1 | 5/2013 | Sabrie et al. | |
| 2013/0345945 A1 | 12/2013 | Fischer et al. | |
| 2014/0012445 A1 | 1/2014 | Fleckenstein et al. | |
| 2014/0091772 A1 | 4/2014 | Del Core | |
| 2014/0292260 A1 | 10/2014 | Dyer et al. | |
| 2015/0069829 A1 | 3/2015 | Dulle et al. | |
| 2015/0239365 A1 | 8/2015 | Hyde et al. | |
| 2015/0345958 A1 | 12/2015 | Graham | |
| 2016/0288659 A1 | 10/2016 | Hammoud et al. | |
| 2017/0101030 A1 | 4/2017 | Hughes et al. | |
| 2017/0225586 A1 | 8/2017 | Zhang et al. | |
| 2018/0072181 A1 | 3/2018 | Christen et al. | |

OTHER PUBLICATIONS

U.S. Appl. No. 15/492,932, filed Apr. 20, 2017, Newman et al.
Official Action for U.S. Appl. No. 15/492,962, dated Jul. 26, 2018 14 pages.

* cited by examiner

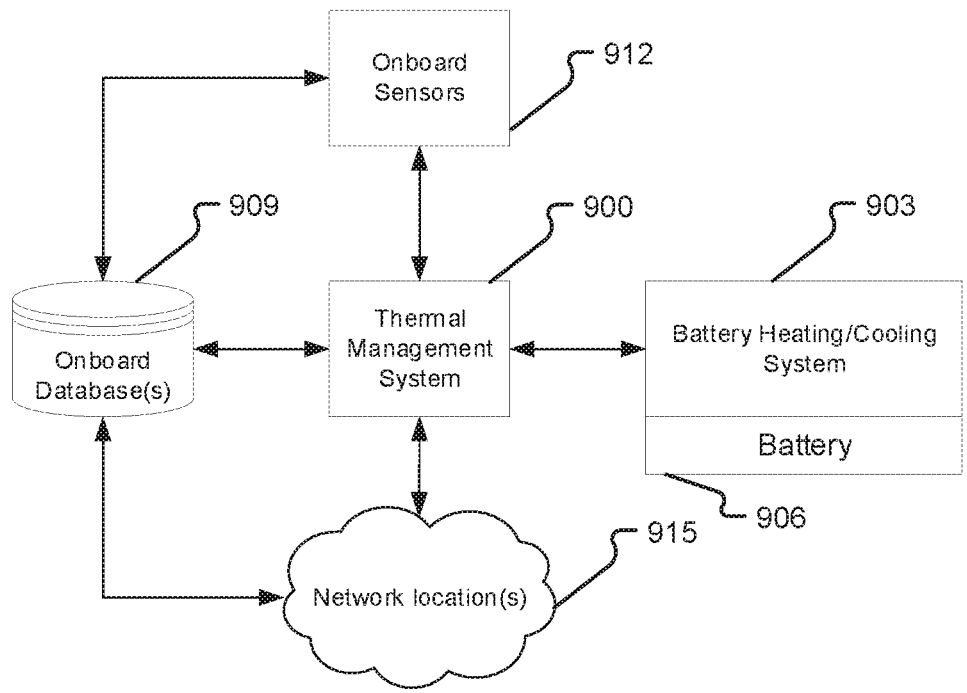

*Fig. 9*

| DATA POINT | EFFECT ON eTa | SOURCE |
|---|---|---|
| Ambient Temperature | -0.50% | Onboard Sensors and Internet Weather Database |
| Wind | 0.25% | Onboard Sensors and Internet Weather Database |
| Rain/Snow | -2.00% | Onboard Sensors and Internet Weather Database |
| Traffic | -4.50% | Onboard Sensors and Internet Traffic Data |
| Driver Characteristics | -0.25% | Onboard Sensors, Internet Driver Characteristics Data, and Onboard database of driver profile |
| Route Characteristics | 2.30% | Onboard Sensors, Internet Route Characteristics Data |
| Vehicle Characteristics | -0.10% | Onboard Sensors, Internet Vehicle Characteristics Data, and Onboard database of vehicle profile |
| Battery Characteristics | -0.40% | Onboard Sensors, Internet Battery Characteristics Data, and Onboard database of battery profile |

*Fig. 10*

SYSTEMS AND METHODS OF BATTERY THERMAL MANAGEMENT

FIELD OF THE INVENTION

The present disclosure relates generally to systems and methods of managing battery thermal qualities and more particularly to methods and systems of implementing dynamic thermal management of an electric vehicle battery.

BACKGROUND OF THE INVENTION

In recent years, vehicle powering methods have changed substantially. This change is due in part to a concern over energy efficiency, utilization of renewable resources, and a societal shift to adopt more environmentally friendly power solutions. These considerations have encouraged the development of a number of new battery systems for electric vehicles.

While conventional battery systems appear to be new, they are generally implemented as a number of traditional subsystems that are merely tied to an alternative power system. In fact, the design and construction of battery systems is typically limited to standard vehicle concepts. Among other things, these limitations fail to take advantage of the benefits of new technology, vehicle information systems, and processing power.

Batteries in battery electric vehicles ("BEVs") can store electricity allowing users of electric vehicles to travel distances. The range of a BEV is in some ways limited to the battery size as well as amount of battery energy consumption. Currently, batteries in BEVs are large, heavy and expensive. The use of large and heavy batteries in a BEV results in a BEV of an increased size. A BEV of an increased size requires large efforts to reduce battery energy consumption.

Thermal management of a battery in an electric vehicle can contribute to the overall range of a vehicle. In some cases, the range of a BEV can be reduced by up to 10-15% due to poor thermal management of the battery. As such, the thermal management of a BEV battery should be minimized to maximize vehicle range.

As battery size and/or capacity of BEVs increase, the power requirement per-battery cell decreases. This reduces the amount of heat generated by the battery; thus, most driving conditions do not require cooling. However, for certain use cases such as high-speed driving, continual uphill driving, DC-fast charging, and hot climates, a battery may reach a threshold temperature and active cooling may be required.

Current battery thermal control schemes are reactive—sensor data and set limits are used to control cooling power to battery thermal management system. Typical conventional systems often focus on the overall control of the battery thermal management system based on known information about a vehicle, that is information gathered during the design phase of the vehicle, in which the system is characterized under a number of different situations. This results in a heuristic based approach which may lower energy usage in some situations; such an approach, however, is not optimal in many ways.

As BEVs become commonplace on roadways throughout the world, the threat of inefficient batteries resulting from poor thermal management becomes ever more present. The need for highly efficient battery thermal management is critical.

There remains a need for a more efficient battery thermal management of a BEV enabling BEVs to be more efficient and capable of travelling longer distances without being greatly increased in size. It is therefore desirable to provide a smart system of battery thermal management taking advantage of all resources accessible by a BEV.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9 is a block diagram of a system in accordance with one or more of the disclosed embodiments;

FIG. 10 is an illustration of a database in accordance with one or more of the disclosed embodiments;

DETAILED DESCRIPTION

Figure 1:
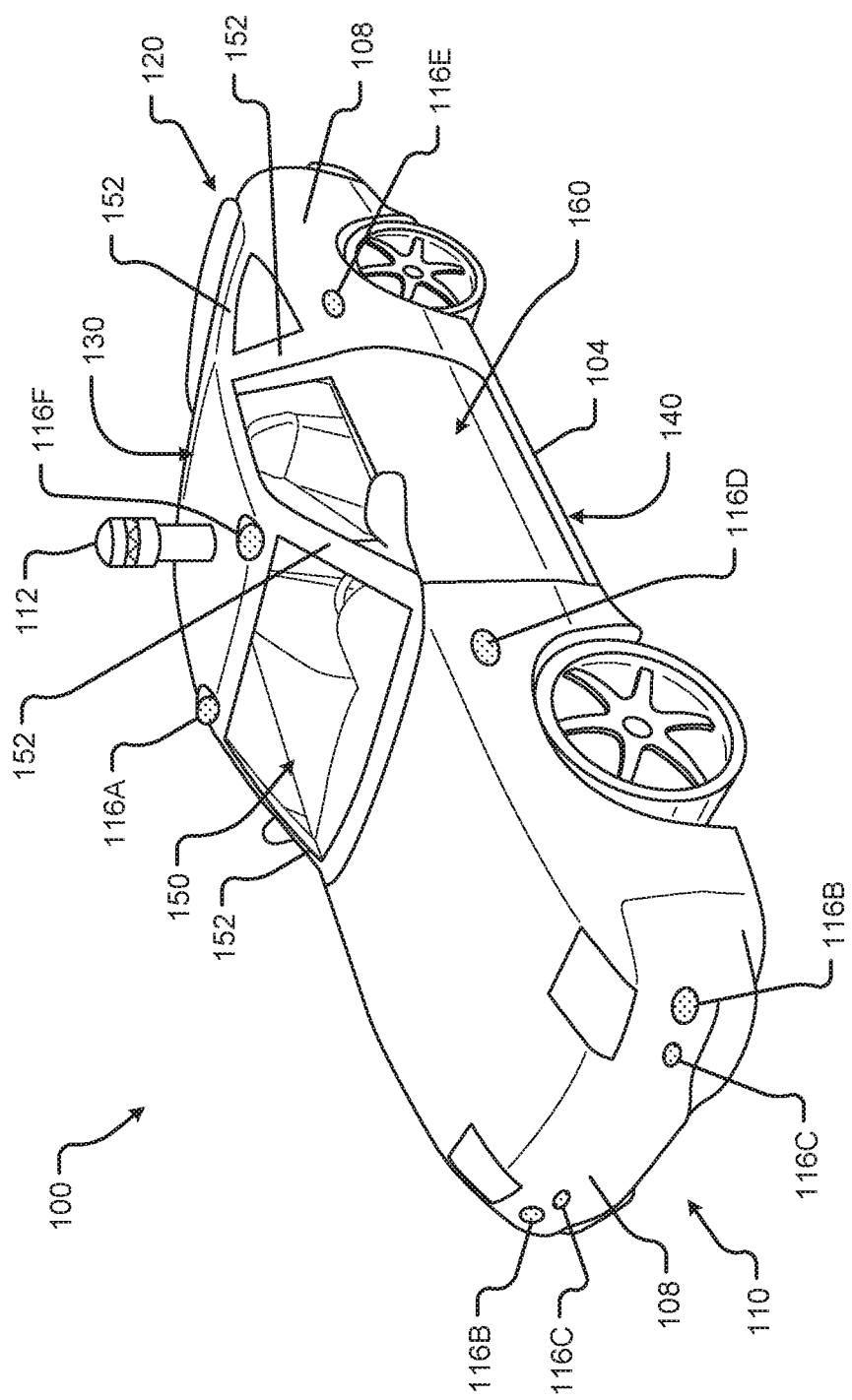
FIG. 1 shows a vehicle in accordance with embodiments of the present disclosure.

What is needed is a highly-efficient battery thermal management control scheme. In some embodiments, a predictive model may be created. Data gathered from an autonomous drive platform of a BEV may be used to update such a model during a trip. A control scheme may be capable of predicting a temperature battery at an upcoming end of a trip. Using the predicted battery temperature, a decision may be made by a processor of an onboard battery management system as to whether active cooling is necessary for the route. If it is determined that cooling is not necessary, the cooling system may simply be turned off, and energy may be saved.

Embodiments of the present disclosure may include the use of vehicle characterization data, combined with data from a network location associated with a current operating scenario. Data used may include information such as trip duration, weather, expected route, for example from GPS, route-calculating algorithms, and weather information. Using such data, the final state of the battery may be predicted. Such a dynamic approach may optimize energy usage under all situations. Some embodiments include one or both of active warming and cooling systems.

These and other needs are addressed by the various embodiments and configurations of the present disclosure. The disclosure is directed generally to an intelligent vehicle battery thermal management system.

The phrases "plurality", "at least one", "one or more", and "and/or" are open-ended expressions that are both conjunctive and disjunctive in operation. For example, each of the expressions "a plurality of A, B and C", "# one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The term "data stream" refers to the flow of data from one or more, typically external, upstream sources to one or more downstream reports.

The term "dependency" or "dependent" refers to direct and indirect relationships between items. For example, item A depends on item B if one or more of the following is true: (i) A is defined in terms of B (B is a term in the expression for A); (ii) A is selected by B (B is a foreign key that chooses which A); and (iii) A is filtered by B (B is a term in a filter expression for A). The dependency is "indirect" if (i) is not true; i.e. indirect dependencies are based solely on selection (ii) and or filtering (iii).

The terms "determine", "calculate" and "compute," and variations thereof, as used herein, are used interchangeably and include any type of methodology, process, mathematical operation or technique.

The term "item" refers to data fields, such as those defined in reports, reporting model, views, or tables in the database.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

Although the present invention is discussed with reference to BEV battery thermal management systems, it is to be understood that the invention can be applied to numerous other architectures. The present invention is intended to include these other architectures.

Embodiments of the present disclosure will be described in connection with a vehicle, and in some embodiments, an electric vehicle, rechargeable electric vehicle, and/or hybrid-electric vehicle and associated systems.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
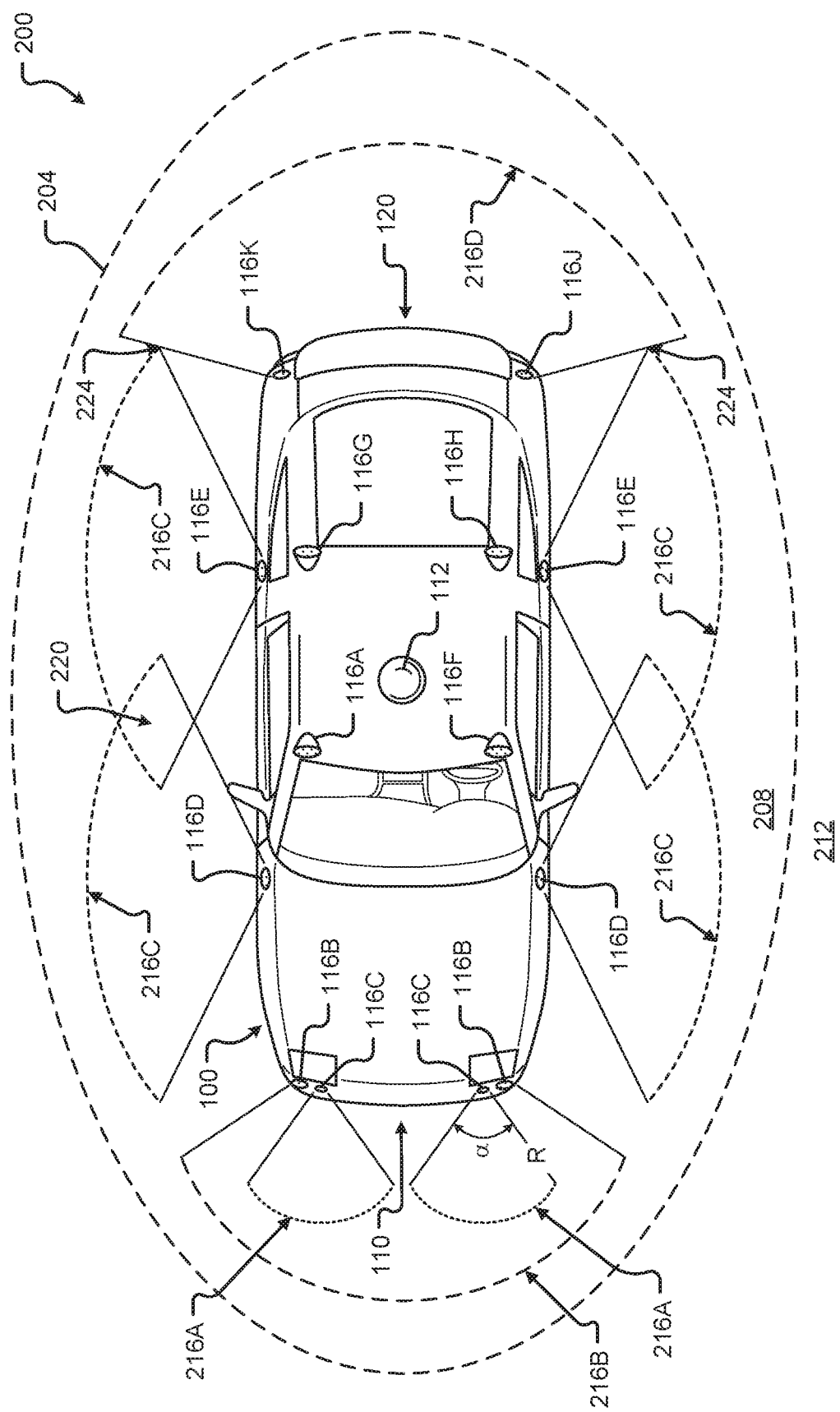
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle may define at least one angle of a span, or between horizontal and/or vertical limits, of a sensor 116A-K. As can be appreciated, the operational detection limit and the operational detection angle of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3A:
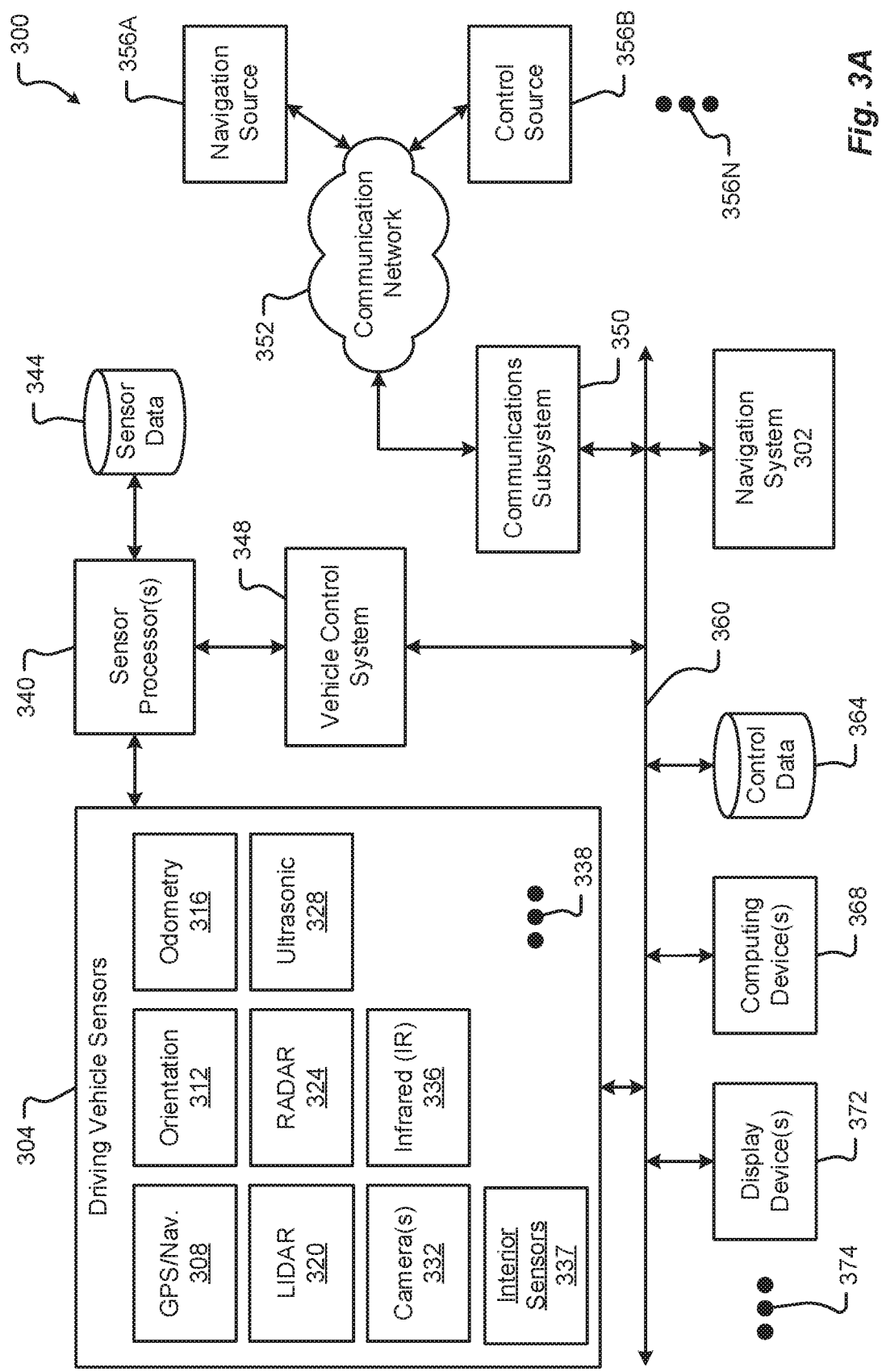
FIG. 3A is a block diagram of an embodiment of a communication environment of the vehicle in accordance with embodiments of the present disclosure.
Figure 3B:
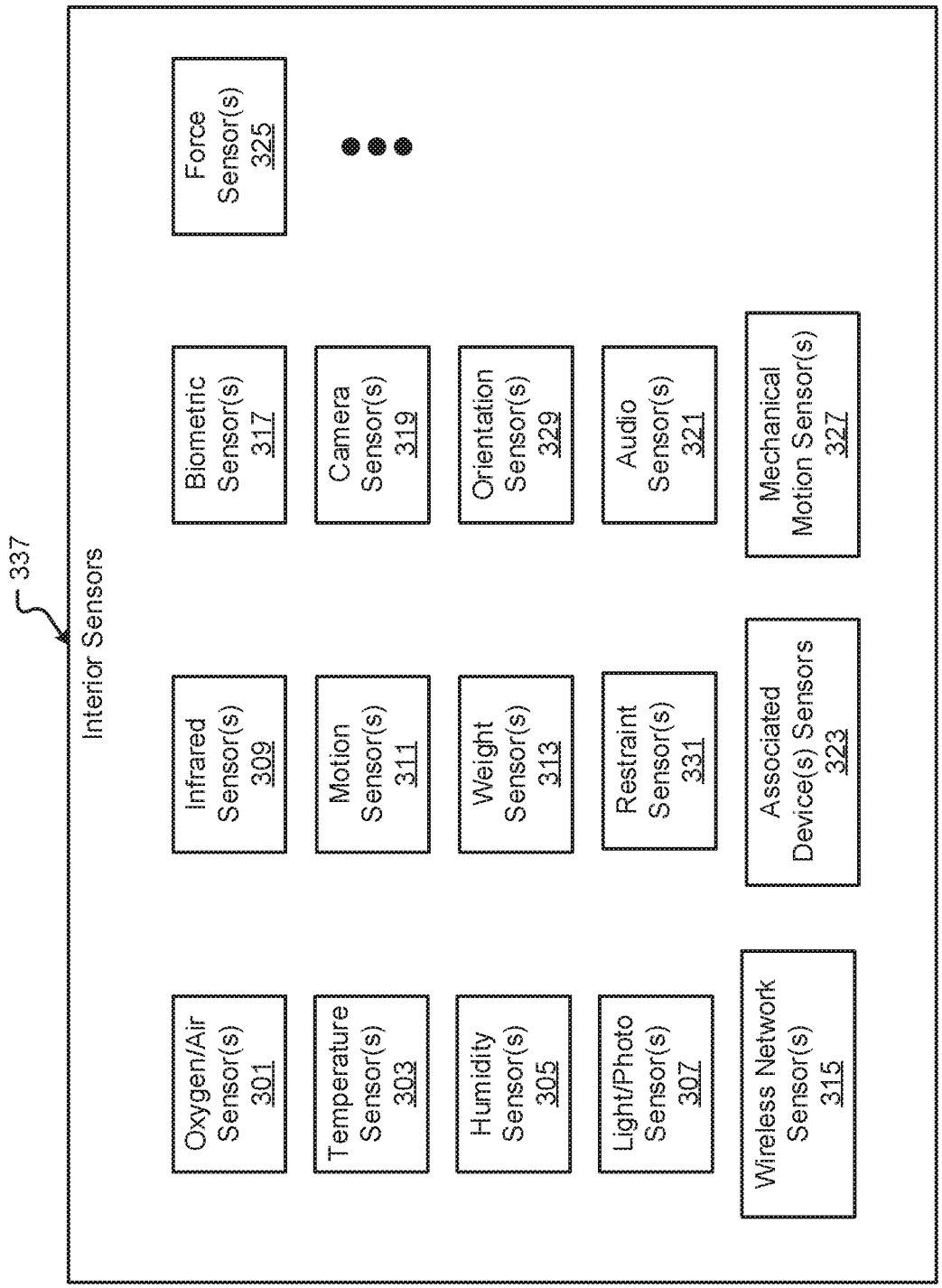
FIG. 3B is a block diagram of an embodiment of interior sensors within the vehicle in accordance with embodiments of the present disclosure.
Figure 3C:
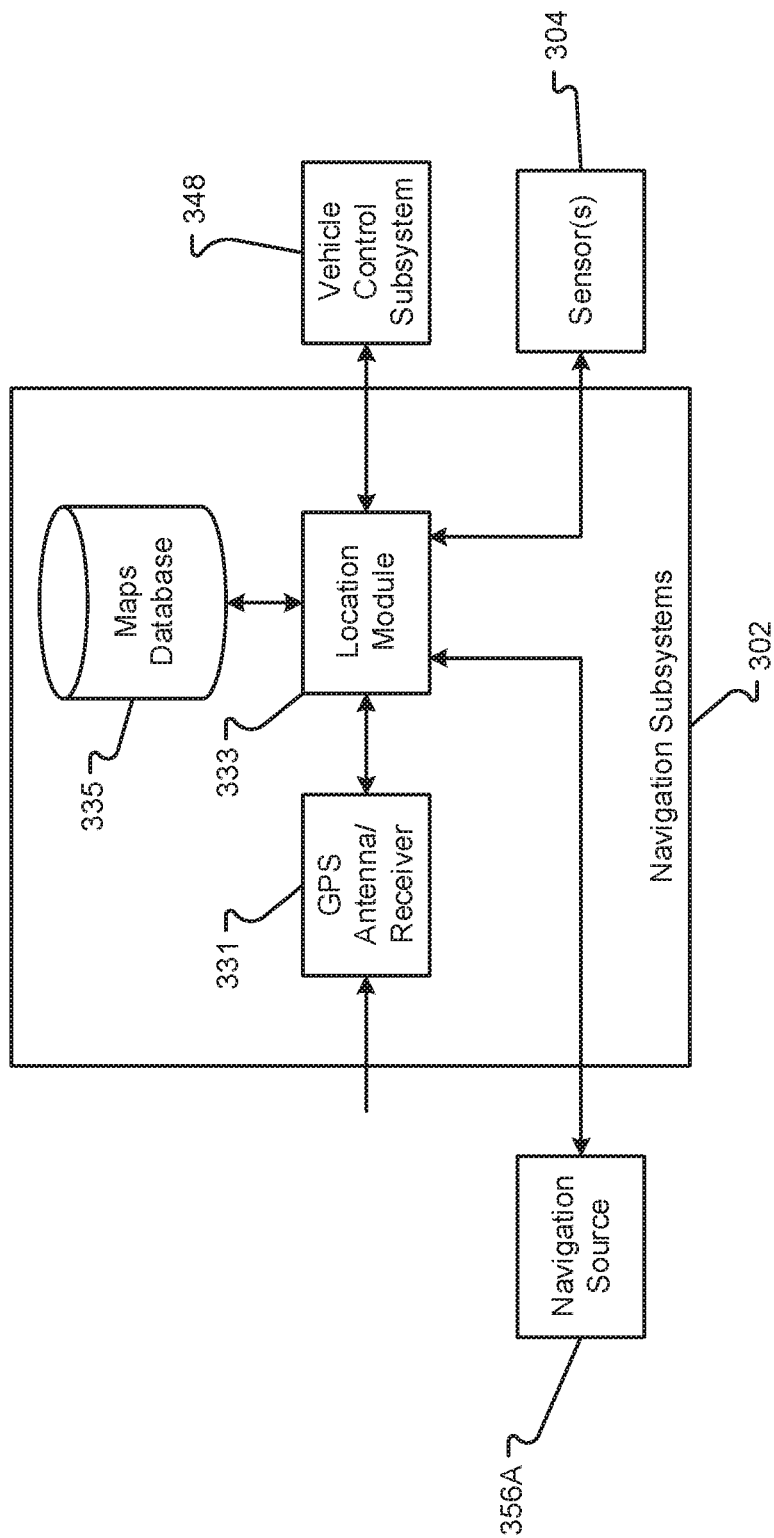
FIG. 3C is a block diagram of an embodiment of a navigation system of the vehicle in accordance with embodiments of the present disclosure.

FIGS. 3A-3C are block diagrams of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Magnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processer. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

The vehicle 100 can also include one or more interior sensors 337. Interior sensors 337 can measure characteristics of the inside environment of the vehicle 100. The interior sensors 337 may be as described in conjunction with FIG. 3B.

A navigation system 302 can include any hardware and/or software used to navigate the vehicle either manually or autonomously. The navigation system 302 may be as described in conjunction with FIG. 3C.

In some embodiments, the driving vehicle sensors and systems 304 may include other sensors 338 and/or combinations of the sensors 306-337 described above. Additionally or alternatively, one or more of the sensors 306-337 described above may include one or more processors configured to process and/or interpret signals detected by the one or more sensors 306-337. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

FIG. 3B shows a block diagram of an embodiment of interior sensors 337 for a vehicle 100. The interior sensors 337 may be arranged into one or more groups, based at least partially on the function of the interior sensors 337. For example, the interior space of a vehicle 100 may include environmental sensors, user interface sensor(s), and/or safety sensors. Additionally or alternatively, there may be sensors associated with various devices inside the vehicle (e.g., smart phones, tablets, mobile computers, wearables, etc.)

Environmental sensors may comprise sensors configured to collect data relating to the internal environment of a vehicle 100. Examples of environmental sensors may include one or more of, but are not limited to: oxygen/air sensors 301, temperature sensors 303, humidity sensors 305, light/photo sensors 307, and more. The oxygen/air sensors 301 may be configured to detect a quality or characteristic of the air in the interior space 108 of the vehicle 100 (e.g., ratios and/or types of gasses comprising the air inside the vehicle 100, dangerous gas levels, safe gas levels, etc.). Temperature sensors 303 may be configured to detect temperature readings of one or more objects, users 216, and/or areas of a vehicle 100. Humidity sensors 305 may detect an amount of water vapor present in the air inside the vehicle 100. The light/photo sensors 307 can detect an amount of light present in the vehicle 100. Further, the light/photo sensors 307 may be configured to detect various levels of light intensity associated with light in the vehicle 100.

User interface sensors may comprise sensors configured to collect data relating to one or more users (e.g., a driver and/or passenger(s)) in a vehicle 100. As can be appreciated, the user interface sensors may include sensors that are configured to collect data from users 216 in one or more areas of the vehicle 100. Examples of user interface sensors may include one or more of, but are not limited to: infrared sensors 309, motion sensors 311, weight sensors 313, wireless network sensors 315, biometric sensors 317, camera (or image) sensors 319, audio sensors 321, and more.

Infrared sensors 309 may be used to measure IR light irradiating from at least one surface, user, or other object in the vehicle 100. Among other things, the Infrared sensors 309 may be used to measure temperatures, form images (especially in low light conditions), identify users 216, and even detect motion in the vehicle 100.

The motion sensors 311 may detect motion and/or movement of objects inside the vehicle 100. Optionally, the motion sensors 311 may be used alone or in combination to detect movement. For example, a user may be operating a vehicle 100 (e.g., while driving, etc.) when a passenger in the rear of the vehicle 100 unbuckles a safety belt and proceeds to move about the vehicle 10. In this example, the movement of the passenger could be detected by the motion sensors 311. In response to detecting the movement and/or the direction associated with the movement, the passenger may be prevented from interfacing with and/or accessing at least some of the vehicle control features. As can be appreciated, the user may be alerted of the movement/motion such that the user can act to prevent the passenger from interfering with the vehicle controls. Optionally, the number of motion sensors in a vehicle may be increased to increase an accuracy associated with motion detected in the vehicle 100.

Weight sensors 313 may be employed to collect data relating to objects and/or users in various areas of the vehicle 100. In some cases, the weight sensors 313 may be included in the seats and/or floor of a vehicle 100. Optionally, the vehicle 100 may include a wireless network sensor 315. This sensor 315 may be configured to detect one or more wireless network(s) inside the vehicle 100. Examples of wireless networks may include, but are not limited to, wireless communications utilizing Bluetooth®, Wi-Fi™, ZigBee, IEEE 802.11, and other wireless technology standards. For example, a mobile hotspot may be detected inside the vehicle 100 via the wireless network sensor 315. In this case, the vehicle 100 may determine to utilize and/or share the mobile hotspot detected via/with one or more other devices associated with the vehicle 100.

Biometric sensors 317 may be employed to identify and/or record characteristics associated with a user. It is anticipated that biometric sensors 317 can include at least one of image sensors, IR sensors, fingerprint readers, weight sensors, load cells, force transducers, heart rate monitors, blood pressure monitors, and the like as provided herein.

The camera sensors 319 may record still images, video, and/or combinations thereof. Camera sensors 319 may be used alone or in combination to identify objects, users, and/or other features, inside the vehicle 100. Two or more camera sensors 319 may be used in combination to form, among other things, stereo and/or three-dimensional (3D) images. The stereo images can be recorded and/or used to determine depth associated with objects and/or users in a vehicle 100. Further, the camera sensors 319 used in combination may determine the complex geometry associated with identifying characteristics of a user. For example, the camera sensors 319 may be used to determine dimensions between various features of a user's face (e.g., the depth/distance from a user's nose to a user's cheeks, a linear distance between the center of a user's eyes, and more). These dimensions may be used to verify, record, and even modify characteristics that serve to identify a user. The camera sensors 319 may also be used to determine movement associated with objects and/or users within the vehicle 100. It should be appreciated that the number of image sensors used in a vehicle 100 may be increased to provide greater dimensional accuracy and/or views of a detected image in the vehicle 100.

The audio sensors 321 may be configured to receive audio input from a user of the vehicle 100. The audio input from a user may correspond to voice commands, conversations detected in the vehicle 100, phone calls made in the vehicle 100, and/or other audible expressions made in the vehicle 100. Audio sensors 321 may include, but are not limited to, microphones and other types of acoustic-to-electric transducers or sensors. Optionally, the interior audio sensors 321 may be configured to receive and convert sound waves into an equivalent analog or digital signal. The interior audio sensors 321 may serve to determine one or more locations associated with various sounds in the vehicle 100. The location of the sounds may be determined based on a comparison of volume levels, intensity, and the like, between sounds detected by two or more interior audio sensors 321. For instance, a first audio sensor 321 may be located in a first area of the vehicle 100 and a second audio sensor 321 may be located in a second area of the vehicle 100. If a sound is detected at a first volume level by the first audio sensors 321A and a second, higher, volume level by the second audio sensors 321 in the second area of the vehicle 100, the sound may be determined to be closer to the second area of the vehicle 100. As can be appreciated, the number of sound receivers used in a vehicle 100 may be increased (e.g., more than two, etc.) to increase measurement accuracy surrounding sound detection and location, or source, of the sound (e.g., via triangulation, etc.).

The safety sensors may comprise sensors configured to collect data relating to the safety of a user and/or one or more components of a vehicle 100. Examples of safety sensors may include one or more of, but are not limited to: force sensors 325, mechanical motion sensors 327, orientation sensors 329, restraint sensors 331, and more.

The force sensors 325 may include one or more sensors inside the vehicle 100 configured to detect a force observed in the vehicle 100. One example of a force sensor 325 may include a force transducer that converts measured forces (e.g., force, weight, pressure, etc.) into output signals. Mechanical motion sensors 327 may correspond to encoders, accelerometers, damped masses, and the like. Optionally, the mechanical motion sensors 327 may be adapted to measure the force of gravity (i.e., G-force) as observed inside the vehicle 100. Measuring the G-force observed inside a vehicle 100 can provide valuable information related to a vehicle's acceleration, deceleration, collisions, and/or forces that may have been suffered by one or more users in the vehicle 100. Orientation sensors 329 can include accelerometers, gyroscopes, magnetic sensors, and the like that are configured to detect an orientation associated with the vehicle 100.

The restraint sensors 331 may correspond to sensors associated with one or more restraint devices and/or systems in a vehicle 100. Seatbelts and airbags are examples of restraint devices and/or systems. As can be appreciated, the restraint devices and/or systems may be associated with one or more sensors that are configured to detect a state of the device/system. The state may include extension, engagement, retraction, disengagement, deployment, and/or other electrical or mechanical conditions associated with the device/system.

The associated device sensors 323 can include any sensors that are associated with a device in the vehicle 100. As previously stated, typical devices may include smart phones, tablets, laptops, mobile computers, and the like. It is anticipated that the various sensors associated with these devices can be employed by the vehicle control system 348. For example, a typical smart phone can include, an image sensor, an IR sensor, audio sensor, gyroscope, accelerometer, wireless network sensor, fingerprint reader, and more. It is an aspect of the present disclosure that one or more of these associated device sensors 323 may be used by one or more subsystems of the vehicle 100.

FIG. 3C illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

The vehicle control system 348, when operating in L4 or L5 and based on sensor information from the external and interior vehicle sensors, can control the driving behavior of the vehicle in response to the current vehicle location, sensed object information, sensed vehicle occupant information, vehicle-related information, exterior environmental information, and navigation information from the maps database 335.

The sensed object information refers to sensed information regarding objects external to the vehicle. Examples include animate objects such as animals and attributes thereof (e.g., animal type, current spatial location, current activity, etc.), and pedestrians and attributes thereof (e.g., identity, age, sex, current spatial location, current activity, etc.), and the like and inanimate objects and attributes thereof such as other vehicles (e.g., current vehicle state or activity (parked or in motion or level of automation currently employed), occupant or operator identity, vehicle type (truck, car, etc.), vehicle spatial location, etc.), curbs (topography and spatial location), potholes (size and spatial location), lane division markers (type or color and spatial locations), signage (type or color and spatial locations such as speed limit signs, yield signs, stop signs, and other restrictive or warning signs), traffic signals (e.g., red, yellow, blue, green, etc.), buildings (spatial locations), walls (height and spatial locations), barricades (height and spatial location), and the like.

The sensed occupant information refers to sensed information regarding occupants internal to the vehicle. Examples include the number and identities of occupants and attributes thereof (e.g., seating position, age, sex, gaze direction, biometric information, authentication information, preferences, historic behavior patterns (such as current or historical user driving behavior, historical user route, destination, and waypoint preferences), nationality, ethnicity and race, language preferences (e.g., Spanish, English, Chinese, etc.), current occupant role (e.g., operator or passenger), occupant priority ranking (e.g., vehicle owner is given a higher ranking than a child occupant), electronic calendar information (e.g., Outlook™), and medical information and history, etc.

The vehicle-related information refers to sensed information regarding the selected vehicle. Examples include vehicle manufacturer, type, model, year of manufacture, current geographic location, current vehicle state or activity (parked or in motion or level of automation currently employed), vehicle specifications and capabilities, currently sensed operational parameters for the vehicle, and other information.

The exterior environmental information refers to sensed information regarding the external environment of the selected vehicle. Examples include road type (pavement, gravel, brick, etc.), road condition (e.g., wet, dry, icy, snowy, etc.), weather condition (e.g., outside temperature, pressure, humidity, wind speed and direction, etc.), ambient light conditions (e.g., time-of-day), degree of development of vehicle surroundings (e.g., urban or rural), and the like.

In a typical implementation, the automated vehicle control system 348, based on feedback from certain sensors, specifically the LIDAR and radar sensors positioned around the circumference of the vehicle, constructs a three-dimensional map in spatial proximity to the vehicle that enables the automated vehicle control system 348 to identify and spatially locate animate and inanimate objects. Other sensors, such as inertial measurement units, gyroscopes, wheel encoders, sonar sensors, motion sensors to perform odometry calculations with respect to nearby moving exterior objects, and exterior facing cameras (e.g., to perform computer vision processing) can provide further contextual information for generation of a more accurate three-dimensional map. The navigation information is combined with the three-dimensional map to provide short, intermediate and long range course tracking and route selection. The vehicle control system 348 processes real-world information as well as GPS data, and driving speed to determine accurately the precise position of each vehicle, down to a few centimeters all while making corrections for nearby animate and inanimate objects.

The vehicle control system 348 can process in substantial real time the aggregate mapping information and models (or predicts) behavior of occupants of the current vehicle and other nearby animate or inanimate objects and, based on the aggregate mapping information and modeled behavior, issues appropriate commands regarding vehicle operation. While some commands are hard-coded into the vehicle, such as stopping at red lights and stop signs, other responses are learned and recorded by profile updates based on previous driving experiences. Examples of learned behavior include a slow-moving or stopped vehicle or emergency vehicle in a right lane suggests a higher probability that the car following it will attempt to pass, a pot hole, rock, or other foreign object in the roadway equates to a higher probability that a driver will swerve to avoid it, and traffic congestion in one lane means that other drivers moving in the same direction will have a higher probability of passing in an adjacent lane or by driving on the shoulder.

Figure 4:
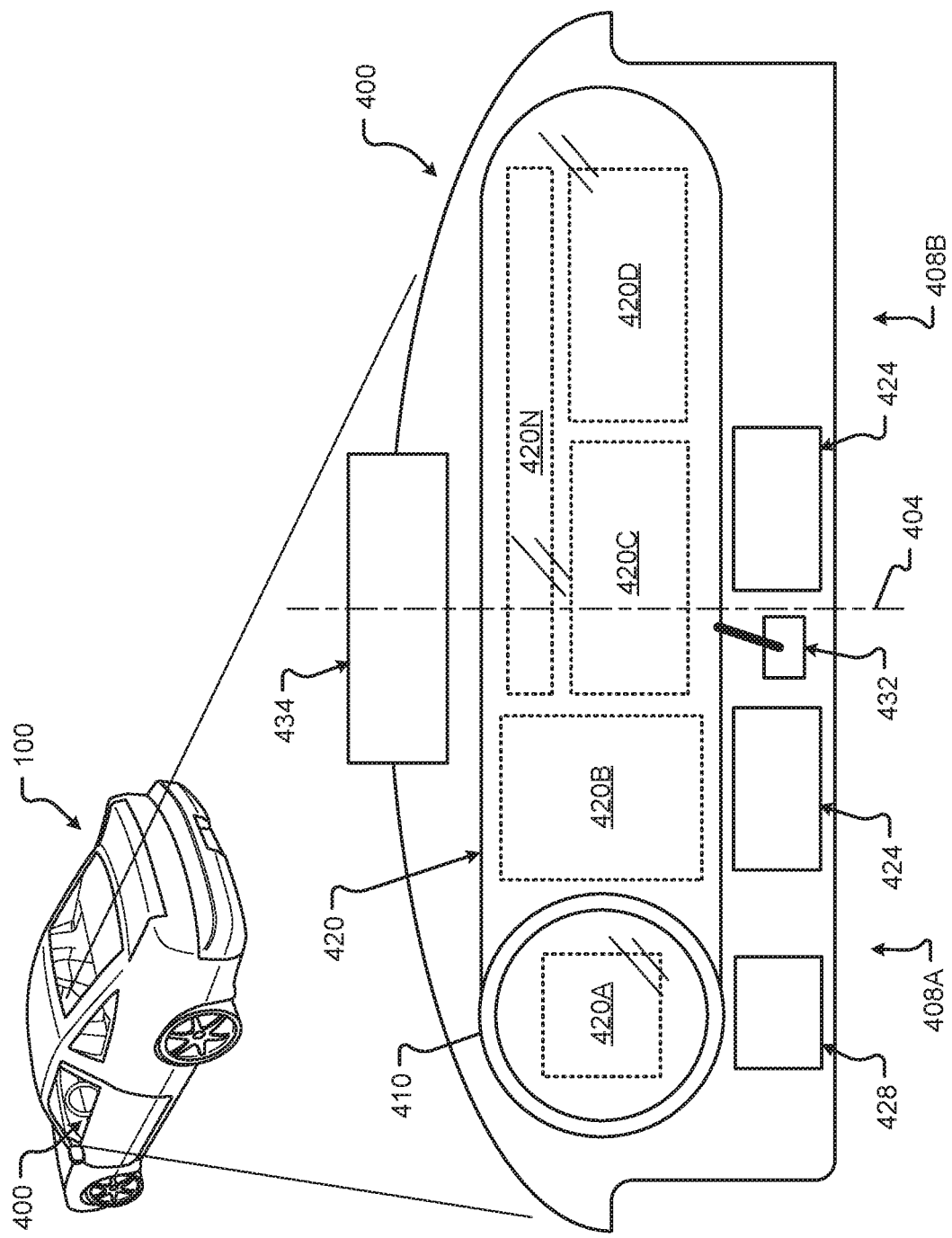
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
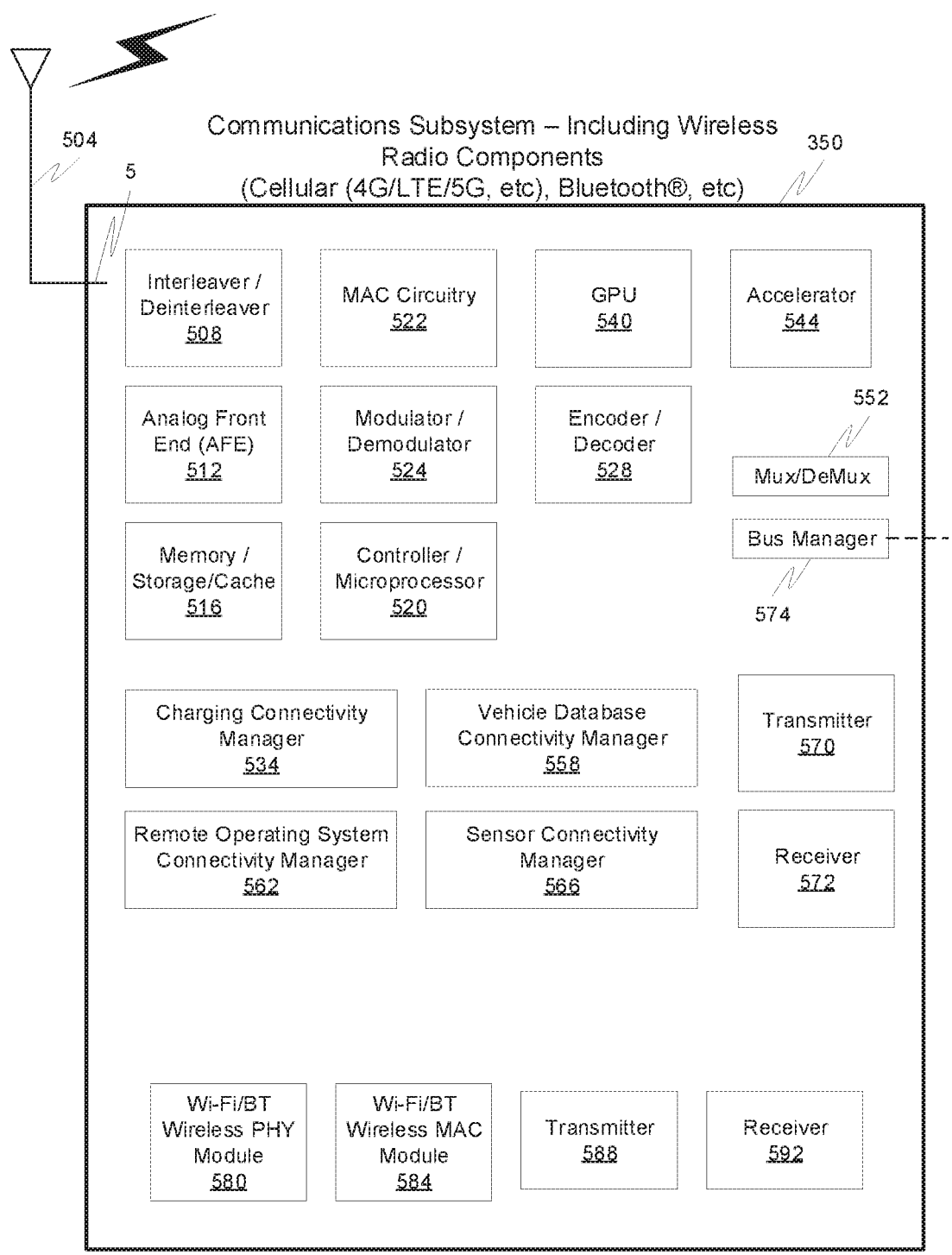
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and additional wireless radio components such as a Wi-Fi PHY/Bluetooth® module 580, a Wi-Fi/BT MAC module 584, additional transmitter(s) 588 and additional receiver(s) 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 570, 588 and receiver(s) 572, 592 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE (Bluetooth® Low-Energy) PHY module 580 and a Wi-Fi/BT/BLE MAC module 584 and optional wireless transmitter 588 and optional wireless receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or more system or subsystems or components and/or devices therein. These identifiers can be used in conjunction with any one or more of the connectivity managers as discussed herein.

Figure 6:
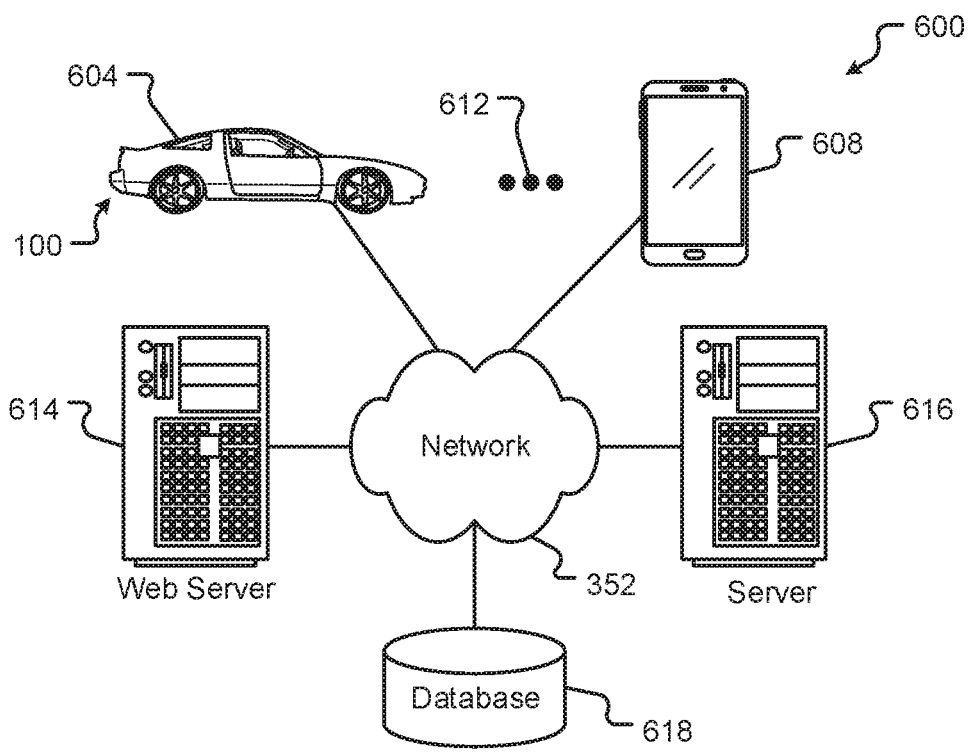
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java® servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java®, C, C #®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
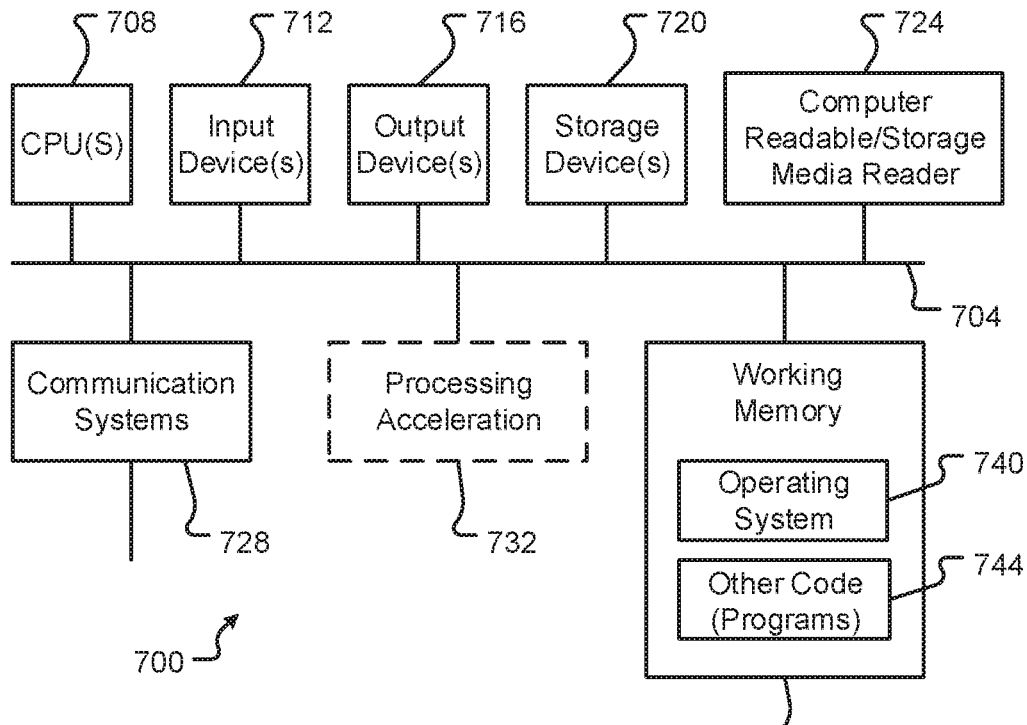
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The temperature of an electric vehicle battery can affect not only the present performance of the electric vehicle, but also the lifetime performance and capacity of the battery. As such, preventing the overheating of a battery is critical. Also, preventing a battery from becoming too cold is also an issue.

During the use of a vehicle, for example during a long trip, the temperature of a battery typically increases. In cold ambient temperatures, on the other hand, a battery may become too cold. A battery may have a maximum and/or a minimum temperature. The maximum and/or minimum temperature of a battery may vary between types of batteries and types of vehicles. The maximum and/or minimum temperature of batteries may also vary between particular batteries of the same size and type.

Preventing a battery from exceeding a maximum temperature and dropping below a minimum temperature is a critical issue. Cooling systems of modern electric vehicle batteries typically operate in a reactive mode. For example, a battery may have a threshold temperature, such that upon a battery reaching the threshold temperature, a cooling (or heating) system may be initiated to prevent the battery from reaching the maximum (or minimum) temperature.

Electric vehicle batteries may have an upper threshold temperature to prevent battery temperatures from reaching the maximum temperature and a lower threshold temperature to prevent battery temperatures from reaching the minimum temperature.

While electric vehicle batteries can operate at temperatures between the upper threshold and the maximum and below the lower threshold and the minimum temperature, excessive amounts of time in these threshold ranges can degrade the life of a battery. Typically, in contemporary vehicles, all operation of a vehicle within the threshold range is avoided. These conventional systems fail to take into consideration the multitude of data accessible to a vehicle management system.

Figure 8:
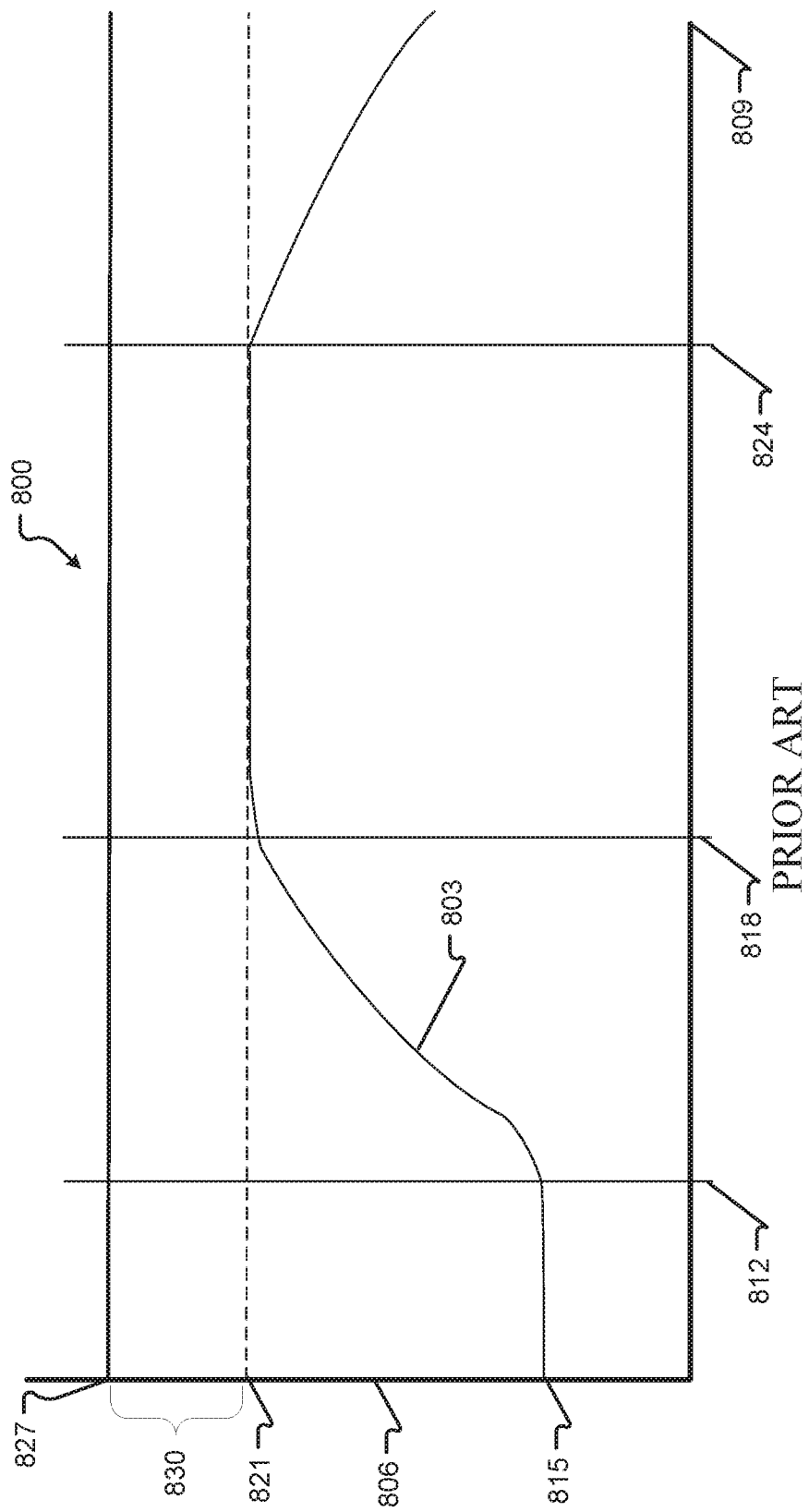
FIG. 8 is a battery temperature profile in accordance with known systems.

As illustrated in the chart 800 of FIG. 8, during the operation of a vehicle, a temperature 803 of a battery may vary. In the chart 800, the temperature is reflected on the vertical axis 806 and the time is reflected on the horizontal axis 809. At time 812, a trip may begin and the vehicle may start. Prior to time 812, the battery temperature 803 may be at an ambient level 815. As the vehicle proceeds through the trip, the battery temperature 803 may begin rising. At some time 818 during the trip, the battery temperature 803 may increase to at or near a threshold temperature 821. In conventional vehicles, a cooling system may begin upon the battery temperature 803 reaching the threshold temperature 821. Thus, for the remainder of the trip, ending at time 824 the battery temperature 803 may be at or below the threshold temperature 821 and not reach the maximum temperature 827. In conventional systems, the critical zone 830 may be avoided. At time 824, the vehicle may arrive at a destination, turn off, and begin to cool naturally back to the ambient temperature 815.

As disclosed herein, a smart thermal management system for electric vehicle batteries can take into consideration one or more data points from one or more data sources. The system as disclosed herein is capable, due to the utilization of such data, of taking advantage of the threshold range of the battery to the maximum efficiency without degrading the life of the battery.

As illustrated in FIG. 9, a thermal management system 900 of a vehicle may communicate with a battery heating and/or cooling system 903. The battery heating and/or cooling system 903 may be capable of interpreting instructions from a processor of the thermal management system 9000 and cooling and/or heating a battery 906 of the vehicle based on the instructions.

In some embodiments, the thermal management system 900 may be a computer system onboard a vehicle. The thermal management system 900 may comprise a processor and memory. In some embodiments, the thermal management system 900 may be a part of one or more other onboard computing systems, such as a battery management unit, a vehicle control unit, etc. The thermal management system 900 may be in communication with a number of data sources. For example, the thermal management system 900 may be in communication with one or more onboard databases 909, onboard sensors 912, and/or one or more network locations 915 such as the Internet or a network connected server.

An onboard database 909 may comprise one or more data points stored in memory. For example, data from a number of different sources may be compiled in a table 1000 as illustrated in FIG. 10. As discussed below, each data point may be gathered from one or more sources. For example, weather and traffic data may be gathered from an internet location. Weather data may also be gathered from onboard sensors. Vehicle characteristics may be in part static information added to a memory unit of the vehicle during manufacturing. Such information about the vehicle may be updated periodically based on circumstances affecting the vehicle performance.

Each data point may also be associated with a rating or score of an effect on the battery temperature. For example, a high ambient temperature may cause a higher battery temperature. A processor of the thermal management system may determine a destination and an estimated time of arrival. The processor of the thermal management system may also determine a route or a likely route of the vehicle to the destination. Using the estimated time of arrival and route information, the processor of the thermal management system may be capable of determining an overall effect of each data point on the battery temperature throughout the remainder of the trip. The processor may, based on a current temperature of the battery and the overall effect of each data point on the battery temperature throughout the remainder of the trip, determine an estimated temperature at arrival.

The thermal management system 900 may access data points such as ambient temperature. Ambient temperature data may comprise a current temperature as measured by onboard sensors 912. Ambient temperature data may also comprise predicted ambient temperatures along a remainder of the route based on any available data, such as weather information on the Internet 915 via a network connection. Weather information may also be available from one or more onboard computing systems. An onboard database 909 may gather such information and update in real-time with any new weather forecast data. Using a combination of a present temperature of the battery along with the current ambient temperature and the forecasted temperature along the remainder of the route, the thermal management system 900 may be capable of estimating a battery temperature at any point along the future route, such as an estimated temperature at arrival ("eTa"). The eTa and estimated battery temperature at other points along the route may further be based on other accessible data.

The thermal management system 900 may access data points such as wind levels. Wind may be measured by onboard sensors 912 and may also comprise predicted wind levels along a remainder of the route based on any available data, such as weather information on the Internet 915 via a network connection. Wind information may also be available from one or more onboard computing systems. An onboard database 909 may gather such information and update in real-time with any new wind forecast data. As a headwind during a trip may cause a vehicle to be less efficient, and a tailwind during a trip may cause a vehicle to be more efficient, and vehicle efficiency has a direct effect on battery temperature, wind levels may play a direct effect on the battery temperature during a trip. Using a combination of a present temperature of the battery along with the current wind level situation and the forecasted wind along the remainder of the route, the thermal management system 900 may be capable of estimating a battery temperature at any point along the future route, such as an estimated temperature at arrival ("eTa"). The eTa and estimated battery temperature at other points along the route may further be based on other accessible data.

The thermal management system 900 may access data points such as weather patterns such as rain and/or snow reports. External weather may be measured by onboard sensors 912 and data may also comprise predicted snow and rain along a remainder of the route based on any available data, such as weather information on the Internet 915 via a network connection. Snow and rain information may also be available from one or more onboard computing systems. An onboard database 909 may gather such information and update in real-time with any new snow and rain forecast data. As wet conditions during a trip may cause a vehicle to be less efficient, and dry conditions during a trip may cause a vehicle to be more efficient, and vehicle efficiency has a direct effect on battery temperature, snow and rain levels may play a direct effect on the battery temperature during a trip. Using a combination of a present temperature of the battery along with the current snow and rain situation and the forecasted snow and rain along the remainder of the route, the thermal management system 900 may be capable of estimating a battery temperature at any point along the future route, such as an estimated temperature at arrival ("eTa"). The eTa and estimated battery temperature at other points along the route may further be based on other accessible data.

The thermal management system 900 may access data points such as traffic reports. External traffic data may be measured by onboard sensors 912 and data may also comprise predicted traffic along a remainder of the route based on any available data, such as traffic information on the Internet 915 via a network connection. Traffic information may also be available from one or more onboard computing systems. An onboard database 909 may gather such information and update in real-time with any new traffic forecast data. As heavy traffic conditions during a trip may cause a vehicle to be less efficient, and low traffic conditions during a trip may cause a vehicle to be more efficient, and vehicle efficiency has a direct effect on battery temperature, traffic levels may play a direct effect on the battery temperature during a trip. Using a combination of a present temperature of the battery along with the current traffic situation and the forecasted traffic along the remainder of the route, the thermal management system 900 may be capable of estimating a battery temperature at any point along the future route, such as an estimated temperature at arrival ("eTa"). The eTa and estimated battery temperature at other points along the route may additionally be based on other accessible data.

The thermal management system 900 may access data points such as driver characteristics. Different drivers of a vehicle may have driving styles that are more or less efficient. For example, some drivers may tend to drive faster and/or more aggressively thus having a negative effect on the temperature of the battery. While the vehicle may operate in a fully-autonomous mode, the driver identity may have little to no effect on the battery temperature.

Driver identity may also enable the thermal management system to predict factors other than driving style which may affect the battery temperature. For example, some drivers may tend to use air conditioning, internet music, or other elements which may negatively affect battery temperature during a ride. As such, an identity of a driver of a vehicle may play a direct effect on the need for heating and/or cooling of a battery of the vehicle during a trip.

A thermal management system may be capable of determining an identity of a driver and predicting the effect on the battery temperature during a drive. A driver identity may be determined in a number of ways. For example, a driver may in some way log-in to the vehicle. The vehicle may also be capable of identifying the driver based on weight, retina scan, fingerprint identification, voiceprint, etc. The driver may save a profile in the car such that the driver identity may be determined based on the touch of a button.

The thermal management system 900 may access data points such as route characteristics. While a vehicle is in use, a GPS signal may allow components of the vehicle to determine a present location. There are many ways in which a vehicle may either determine or predict a destination. For example, a user may enter a destination through a user interface or may request a destination via communication with an artificial intelligence assistant. A vehicle may also predict a destination based on a number of factors, such as driver history, past trips, calendar events, etc.

When a vehicle has determined an origin and a destination for a current trip, the vehicle may next determine a route from the origin to the destination. The route may be determined based on factors such as shortest duration, shortest distance, etc. The thermal management system 900 may determine one or more route characteristics based on the determined route. Route characteristics may comprise factors such as average speed, number and steepness of hills, number and sharpness of curves, etc. In some embodiments, the thermal management system 900 may determine the effect of each route characteristic factor on the temperature of the battery of the vehicle at various points during the trip. Route characteristics may comprise other factors, such as information associated with known, predicted, or suggested stops along the route. For example, the thermal management system 900 may determine a stop may be required during a trip for a charging of the battery. The thermal management system 900 may have access to information regarding how such a charging stop may affect the temperature of the battery. For example, the thermal management system 900 may determine, or obtain from a database via a network connection, an estimated potential wait time for the vehicle at a charging station prior to the charging of the vehicle. During long trips, the thermal management system 900 may additionally have access to information such as pit stops, stops at a restaurant drive-thru, stops at red-lights, stop signs, and other intersections, etc. Any such information may be used in the determination of the effect of the route on the temperature of the vehicle.

The thermal management system 900 may access data points such as driver characteristics. Different drivers of a vehicle may have driving styles that are more or less efficient. For example, some drivers may tend to drive faster and/or more aggressively thus having a negative effect on the temperature of the battery. While the vehicle may operate in a fully-autonomous mode, the driver identity may have little to no effect on the battery temperature.

Driver identity may also enable the thermal management system to predict factors other than driving style which may affect the battery temperature. For example, some drivers may tend to use air conditioning, internet music, or other elements which may negatively affect battery temperature during a ride. As such, an identity of a driver of a vehicle may play a direct effect on the need for heating and/or cooling of a battery of the vehicle during a trip.

A thermal management system may be capable of determining an identity of a driver and predicting the effect on the battery temperature during a drive. A driver identity may be determined in a number of ways. For example, a driver may in some way log-in to the vehicle. The vehicle may also be capable of identifying the driver based on weight, retina scan, fingerprint identification, voiceprint, etc. The driver may save a profile in the car such that the driver identity may be determined based on the touch of a button. Driver profiles may also be shared between vehicles and saved in a cloud-based computing system. The thermal management system may download such information from a network connection to use in updating the estimated battery temperature.

The thermal management system 900 may access data points such as vehicle characteristics. Vehicle characteristics may include information such as weight of the vehicle. The weight of the vehicle may be determined based on a base weight depending on the type of vehicle and may also be updated at the beginning of a trip based on onboard sensors. Vehicle characteristics may comprise information associated with the particular type of vehicle, such as a make and model. In general, a particular make and model of a vehicle may have particular characteristics affecting a battery temperature. Such information may be uploaded to an onboard memory unit during manufacturing. Such information may also be shared via a network connection. During the life of a vehicle, vehicle characteristics may change due to events such as vehicle repairs and due to any ongoing issues which may have an effect on the temperature of a battery.

The thermal management system 900 may access data points such as battery characteristics. A thermal management system 900 may determine a type of battery in the vehicle and may consult a data source for information related to predicted battery temperatures during a trip. The thermal management system 900 may also consider information related to the battery characteristics based on onboard sensors, such as a temperature sensor, pressure sensor, or other information. Throughout the life of a vehicle, the thermal management system 900 may be capable of creating and updating a profile of the battery such that future temperature predictions benefit from past temperature measurements.

Figure 11:
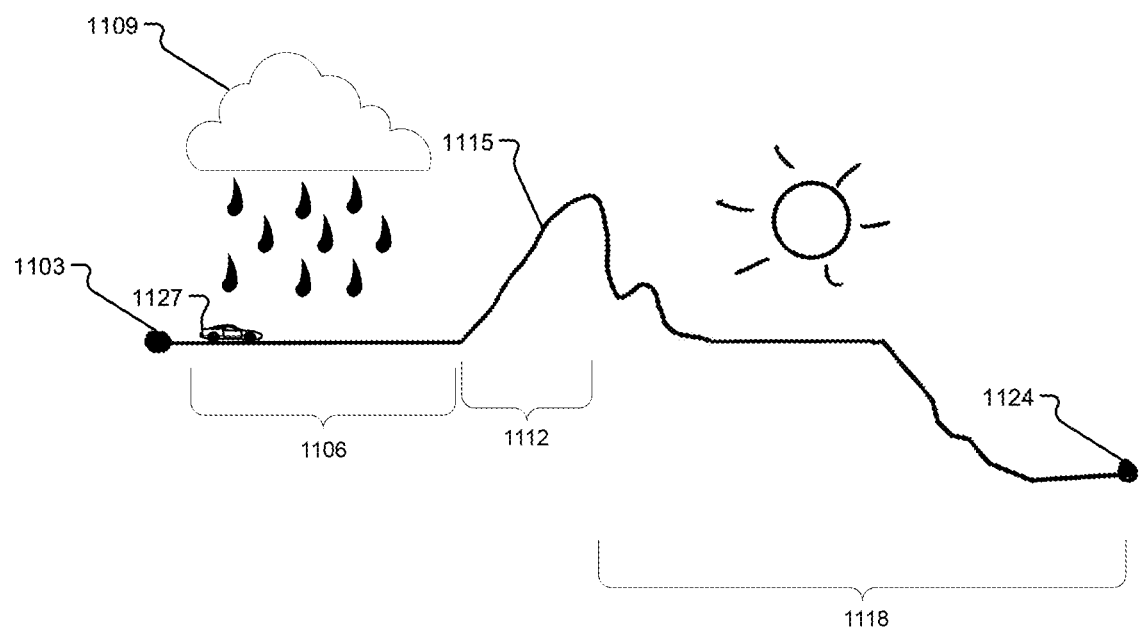
FIG. 11 is an illustration of a route in accordance with one or more of the disclosed embodiments.

As a vehicle begins a trip, the vehicle may determine or predict a destination for the trip. The destination may be determined based on instructions from a user, or predicted based on past trips or other information. As illustrated in FIG. 11, a route 1115 of a vehicle 1127 may comprise an origin 1103 and a destination 1124. Between the origin 1103 and the destination 1124, the route 1115 may comprise a number of variables and factors which may affect the battery temperature during the trip. A number of factors, such as vehicle and passenger weight, driver profile, route characteristics (e.g. hills, road type, etc.) and battery characteristics may be determined at the beginning of a trip and may typically remain unchanged. A number of other factors, such as weather, temperature, windspeed, etc. may change constantly throughout a trip. A thermal management system of the vehicle 1127 may continuously or periodically update such information during the course of a trip.

For example, in the illustrative roadway of FIG. 11, the vehicle 1127 may, at the beginning 1103 of the trip, determine the destination, determine the route or predict the route, and based on the determined or predicted route determine a number of route characteristics. The vehicle thermal management system may further determine weather throughout the route and generate an estimate battery temperature profile for the course of the trip. During the trip, the vehicle may constantly or periodically update the temperature profile estimate based on any change in any factors such as weather, wind, route characteristics, driver characteristics, etc.

As can be appreciated from FIG. 11, the vehicle 1127 may comprise a thermal management system which may gather information about the vehicle, about the rain 1109 in the first portion 1106 of the route, the hills in the second portion 1112 of the route, and the downhill and sunny end portion 1118 of the route. The thermal management system of the vehicle 1127 may determine the rain at the beginning of the trip may result in an increased battery temperature. The thermal management system of the vehicle 1127 may also determine the uphill section in the second portion 1112 of the route may result in increased battery temperature. The thermal management system of the vehicle 1127 may also determine the downhill and sunny end portion 1118 of the route may result in a lowered battery temperature at arrival at the destination 1124. The thermal management system of the vehicle 1127 may also, at the initiation of the route, determine a weight of the vehicle, a characteristic of the driver, and other static factors.

During the trip, the thermal management system of the vehicle 1127 may update any or all relative factors based on any new information regarding passengers, driver, weather, route changes, etc. Throughout the trip, the thermal management system of the vehicle 1127 may update a battery temperature profile and an estimated temperature at arrival of the battery.

Referring back to the chart 800 of FIG. 8, during the operation of a vehicle, a temperature 803 of a battery may vary. In the chart 800, the temperature is reflected on the vertical axis 806 and the time is reflected on the horizontal axis 809. At time 812, a trip may begin and the vehicle may start. Prior to time 812, the battery temperature 803 may be at an ambient level 815. As the vehicle proceeds through the trip, the battery temperature 803 may begin rising. At some time 818 during the trip, the battery temperature 803 may increase to at or near a threshold temperature 821. In conventional vehicles, a cooling system may begin upon the battery temperature 803 reaching the threshold temperature 821. Thus, for the remainder of the trip, ending at time 824 the battery temperature 803 may be at or below the threshold temperature 821 and not reach the maximum temperature 827. In conventional systems, the critical zone 830 may be avoided. At time 824, the vehicle may arrive at a destination, turn off, and begin to cool naturally back to the ambient temperature 815.

Figure 12:
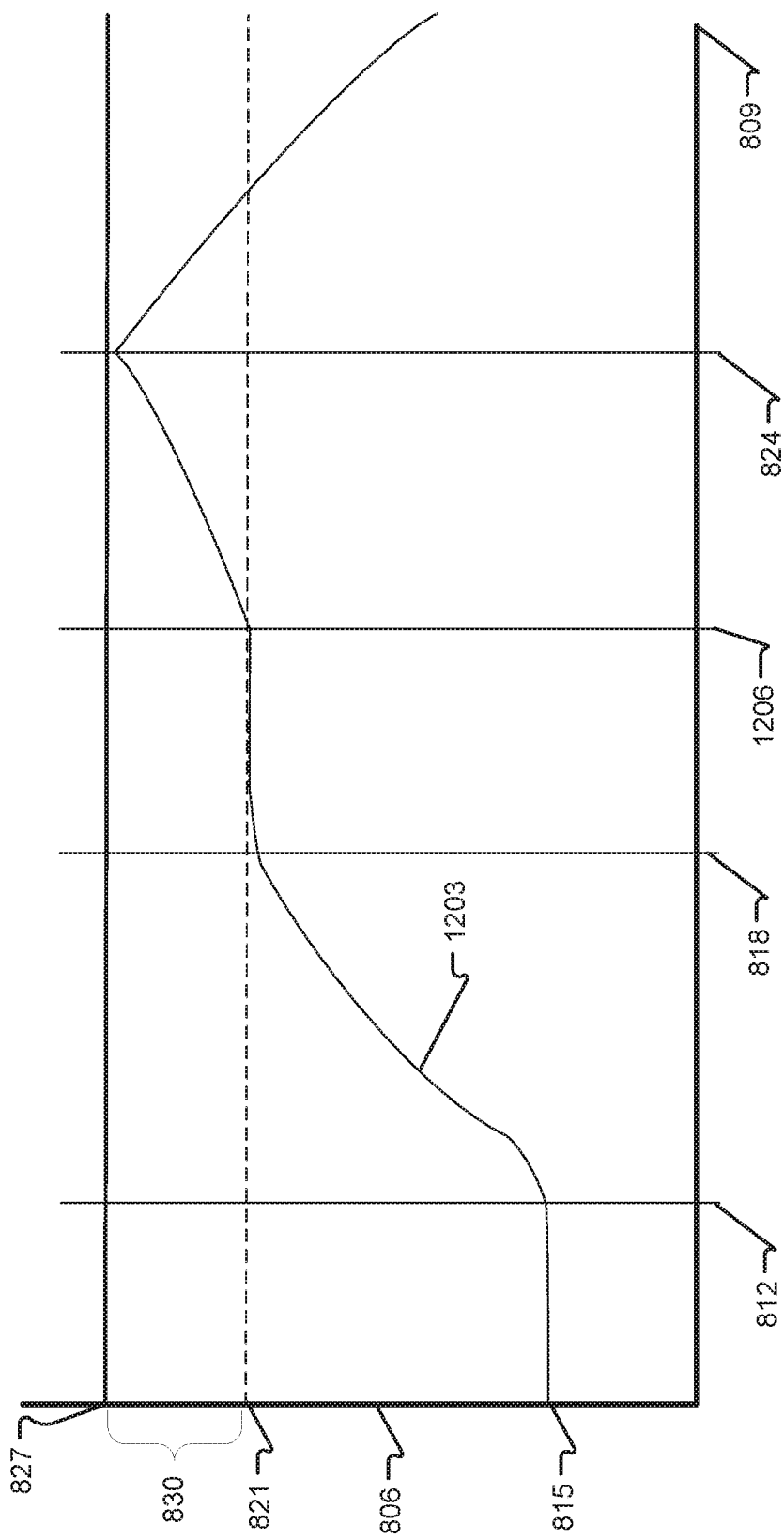
FIG. 12 is a battery temperature profile in accordance with one or more of the disclosed embodiments.

In contrast to conventional systems, the present disclosure presents a battery thermal management system which may take advantage of the zone 830 between the threshold temperature 821 and the maximum temperature 827 of the battery by considering all data associated with a route and vehicle to estimate the future battery temperature during the course of the trip. As illustrated in FIG. 12, a battery temperature 1203 may increase starting at the beginning 812 of a route. At time 818, the battery temperature 1203 may be at or near the threshold temperature 821. As the battery temperature 1203 reaches the threshold temperature 821, the thermal management system may instruct a cooling system of the vehicle to begin cooling the battery. At some point in time 1206, the thermal management system may determine the estimated temperature at arrival of the battery, if no more cooling is applied, would be less than the maximum temperature 827 of the battery. At such time 1206, the thermal management system may determine the cooling system can be shut off without detrimentally affecting the future performance of the battery. As the cooling system is shut off at time 1206, the temperature of the battery 1203 may begin to rise toward the maximum temperature. At the end of the trip 824, the temperature of the battery 1203 may still be less than the maximum temperature 827. After the end of the trip 824, the battery may cool back down towards the ambient temperature 815 as the vehicle is turned off.

By disabling the cooling system for the maximum amount of time without damaging the battery, the vehicle thermal management system is able to reduce energy used by the vehicle during the time 1206 until the end of the trip when compared to conventional systems.

Figure 13:
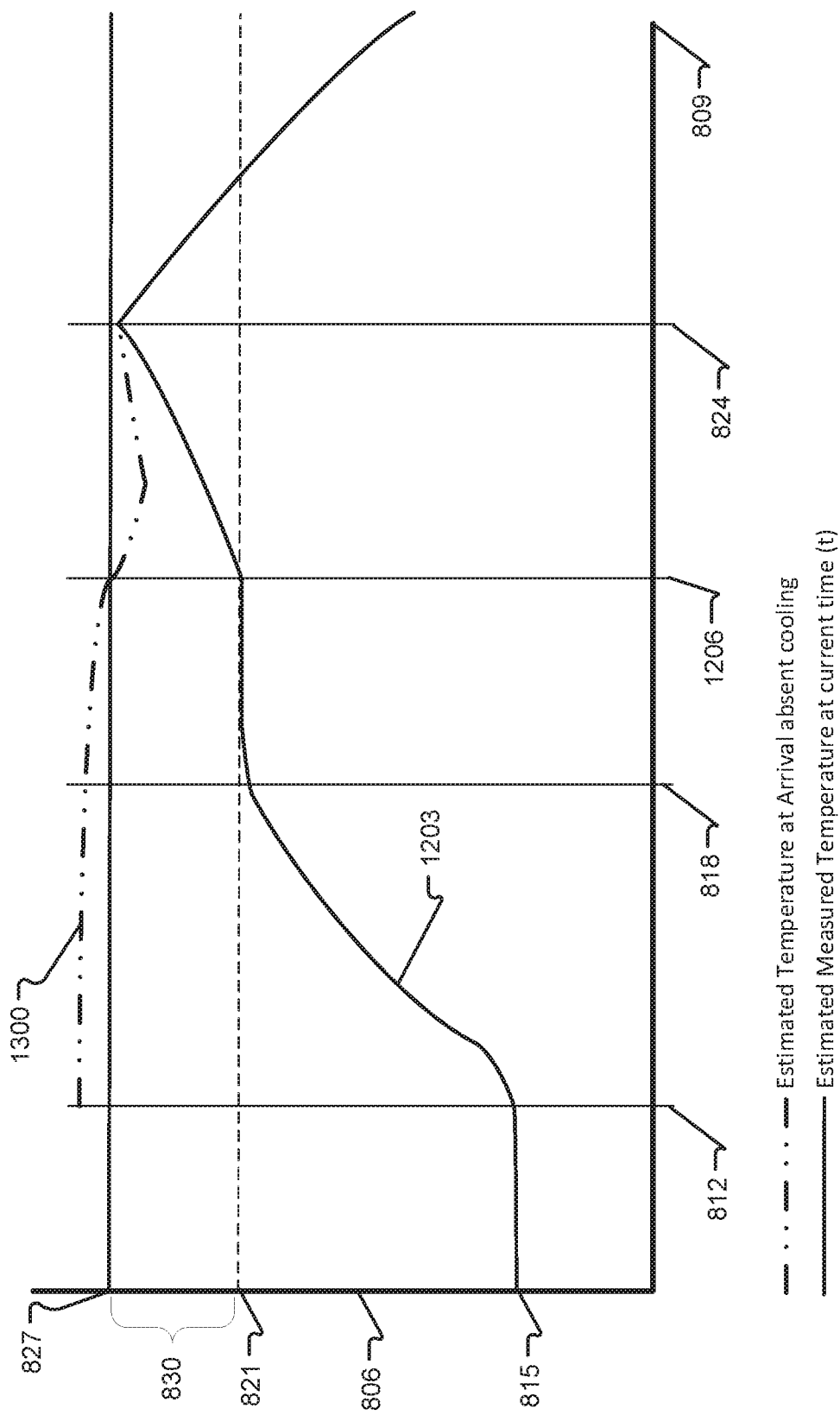
FIG. 13 is a battery temperature and estimated temperature at arrival profile in accordance with one or more of the disclosed embodiments.

As illustrated in FIG. 13, in addition to monitoring the present temperature 1203 of the battery and predicting the temperature of the battery at the destination 824, the thermal management system may generate a profile of the estimated temperature throughout the course of the trip and a profile of the estimated temperature at arrival 1300 of the vehicle. Using the generated profile of the estimated temperature throughout the course of the trip, the thermal management system may be capable, in real-time, of estimating the temperature of the battery at the time of arrival of the vehicle at the destination—that is, given all known data points associated with the remainder of the trip, regarding route characteristics, driver characteristics, weather, etc., the thermal management system may predict an estimated temperature at arrival. The estimated temperature at arrival may be with the assumption that the cooling and/or heating system is disabled for the remainder of the trip. In this way, the vehicle's thermal management system may be capable of determining at what point it is safe to disable thermal management of the battery while still allowing the vehicle to arrive at the destination without reaching and/or surpassing the maximum temperature of the battery.

Figure 14:
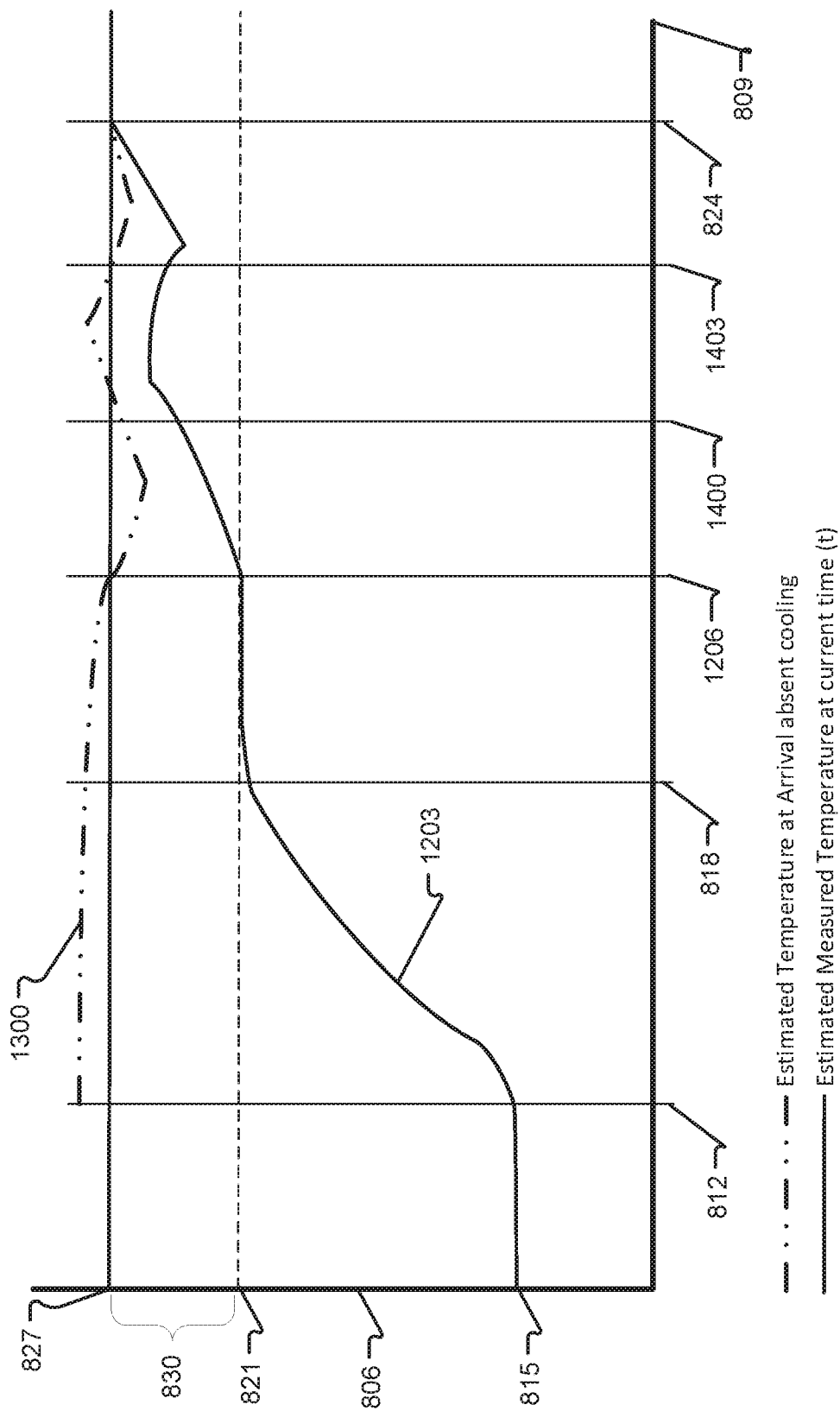
FIG. 14 is a battery temperature and estimated temperature at arrival profile in accordance with one or more of the disclosed embodiments.

As illustrated in FIG. 14, while the thermal management system of a vehicle may be capable of making informed estimations of the temperature of the battery at arrival ("eTa"), due to unforeseen changes in circumstances, the eTa may change after the point the thermal management system determined it would be safe to disable the battery's thermal management. In some embodiments, the thermal management system may first estimate the temperature at arrival will be lower than the battery's maximum temperature, and may at a later time 1400 a change in circumstances may occur and the thermal management system may estimate the temperature at arrival will be higher than the battery's maximum temperature. At such a later time, the thermal management system may instruct a cooling unit to begin cooling the battery. The cooling unit may continue cooling the battery until a time 1403 in which the thermal management system determines the estimated temperature of the battery at the time of arrival will be lower than a maximum temperature of the battery.

In some embodiments, in addition to having a maximum temperature and a threshold temperature, a battery may have a particular amount of time in which it can safely remain above the threshold temperature. For example, a battery may have a maximum temperature of 200 degrees Fahrenheit and a threshold temperature of 180 degrees Fahrenheit. The battery may also have a known characteristic in which it may sustain temporary or permanent damage if the battery remains above 180 degrees Fahrenheit for more than 30 minutes. For such an example battery, a thermal management system may track the amount of time the battery spends above the threshold temperature and additional cooling may be applied in order to keep the amount of time the battery spends above the threshold temperature for that particular battery's maximum amount of allowed time above the threshold.

Figure 15:
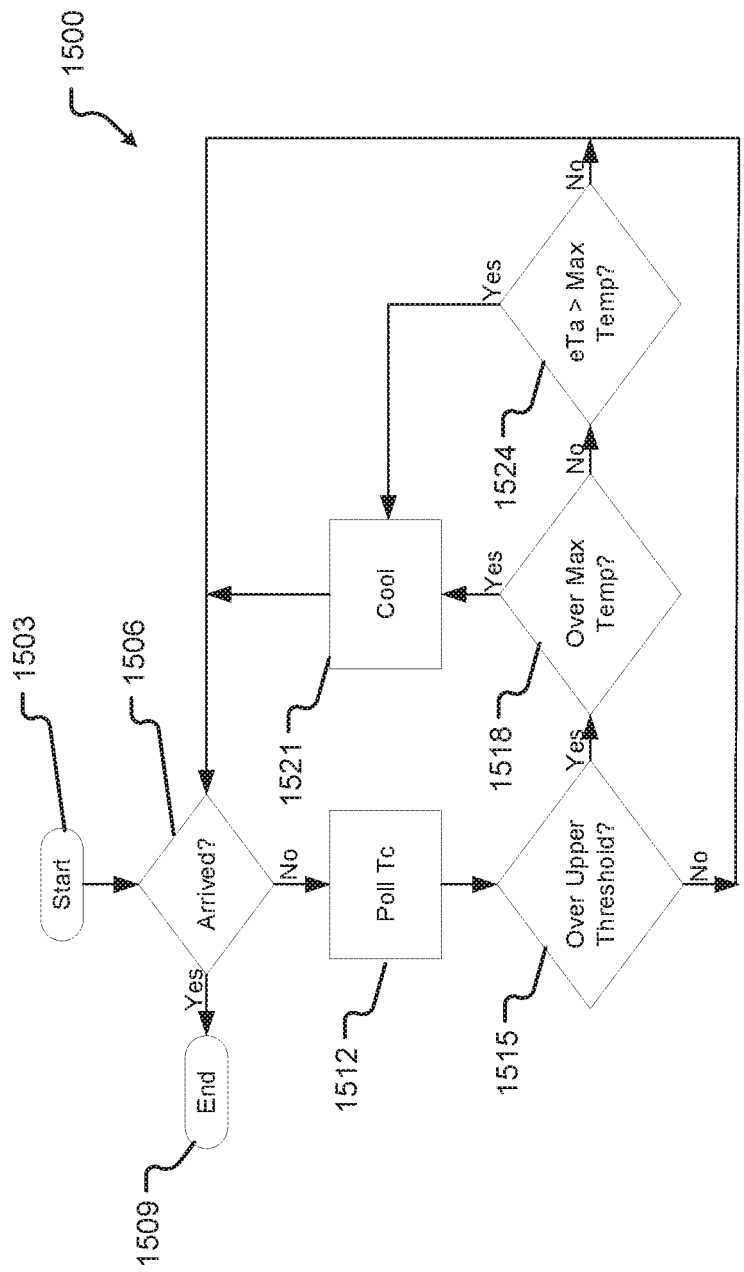
FIG. 15 is a block diagram illustration of a method in accordance with one or more of the disclosed embodiments.

As illustrated in FIG. 15, a thermal management system may perform a method 1500 of managing a cooling unit of a battery for a vehicle. At the start 1503 of the method 1500, the thermal management system of the vehicle may determine, or be aware of, the many data points which may be used in calculating an estimated temperature at arrival of the battery. The thermal management system may also determine, or be aware of, the maximum allowed temperature of the battery as well as the threshold temperature of the battery.

The method 1500 may begin by first determining if the vehicle has arrived at the destination at step 1506. If the vehicle has arrived, the method 1500 may end 1509, as the vehicle may be safely turned off. If the vehicle has not arrived, the method 1500 may proceed to a step 1512 of the thermal management system determining a current temperature of the battery. The thermal management system may determine the current temperature of the battery by polling a temperature sensor on the battery. The thermal management system may otherwise determine the current temperature of the battery in other ways.

The thermal management system, after polling the current temperature of the battery, may determine whether the current temperature of the battery is above the threshold temperature of the battery at step 1515. If the current temperature of the battery is not above the threshold temperature, the method may simply comprise returning to the step 1506 of determining whether the vehicle has arrived. As such, if the battery temperature is below threshold, the vehicle may simply continue driving without the cooling unit initiating.

If the current temperature of the battery is determined to be over the upper threshold, in step 1515, the method 1500 may comprise determining whether the current temperature of the battery is over the maximum temperature of the vehicle in step 1518. If the current temperature of the battery is over the maximum temperature of the vehicle, the method 1500 may comprise initiating the cooling of the battery in step 1521.

If, on the other hand, the battery temperature is above the threshold temperature and not above the maximum temperature, the thermal management system may next determine whether the estimated temperature at arrival is above the maximum temperature at step 1524. If the estimated temperature at arrival is above the maximum temperature at step 1524, the method may comprise initiating the cooling of the battery at step 1521 and returning to the step 1506 of determining if the vehicle has arrived. If, on the other hand, the estimated temperature at arrival is determined to be below the maximum temperature, the method 1500 may simply return to the step 1506 of determining if the vehicle has arrived, and the loop may continue until the vehicle has arrived.

While many of the embodiments described herein associate with the scenario of an overheating battery, the thermal management system may also be capable of instructing a heater to apply heat to a battery in the case of an overly cold battery. As such, all descriptions of maximum temperatures may equally be applied to cases of minimum temperatures.

Figure 16:
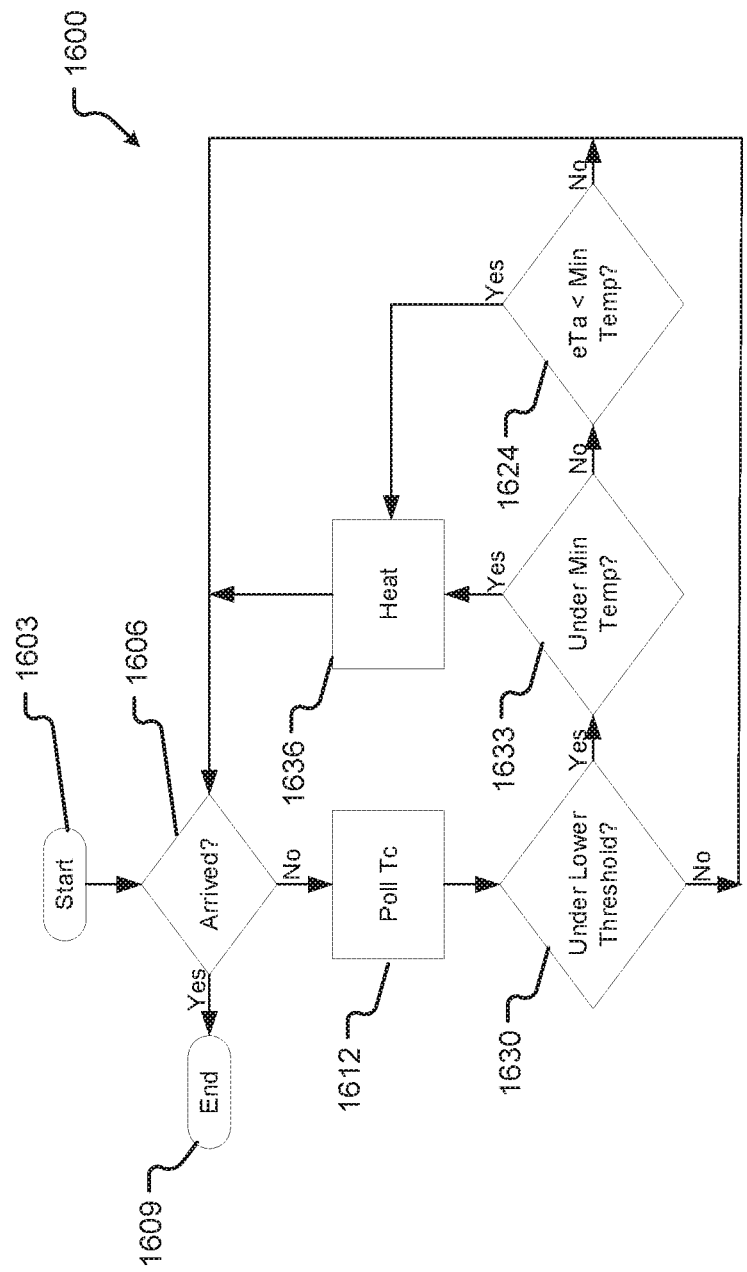
FIG. 16 is a block diagram illustration of a method in accordance with one or more of the disclosed embodiments.

As illustrated in FIG. 16, a thermal management system may perform a method 1600 of managing a heating unit of a battery for a vehicle. At the start 1603 of the method 1600, the thermal management system of the vehicle may determine, or be aware of, the many data points which may be used in calculating an estimated temperature at arrival of the battery. The thermal management system may also determine, or be aware of, a minimum allowed temperature of the battery as well as a lower threshold temperature of the battery.

The method 1600 may begin by first determining if the vehicle has arrived at the destination in step 1606. If the vehicle has arrived, the method 1600 may end at step 1609, as the vehicle may be safely turned off. If the vehicle has not arrived, the method 1600 may proceed to a step 1612 of the thermal management system determining a current temperature of the battery. The thermal management system may determine the current temperature of the battery by polling a temperature sensor on the battery. The thermal management system may otherwise determine the current temperature of the battery in other ways.

The thermal management system, after polling the current temperature of the battery, may determine whether the current temperature of the battery is under the lower threshold temperature of the battery at step 1630. If the current temperature of the battery is not under the lower threshold temperature, the method 1600 may simply comprise returning to the step 1606 of determining whether the vehicle has arrived. As such, if the battery temperature is not under the lower threshold, the vehicle may simply continue driving without a heating unit initiating.

If the current temperature of the battery is determined to be below the lower threshold, in step 1630, the method 1600 may comprise determining whether the current temperature of the battery is under the minimum temperature of the vehicle in step 1633. If the current temperature of the battery is under the minimum temperature of the vehicle, the method 1600 may comprise initiating the heating of the battery in step 1636.

If, on the other hand, the battery temperature is under the lower threshold temperature and not under the minimum temperature, the thermal management system may next determine whether the estimated temperature at arrival is below the minimum temperature at step 1639. If the estimated temperature at arrival is below the minimum temperature, the method may comprise initiating the heating of the battery at step 1636 before returning to the step 1606 of determining if the vehicle has arrived. If, on the other hand, the estimated temperature at arrival is not below the minimum temperature, the method 1600 may simply return to the step 1606 of determining if the vehicle has arrived, and the loop may continue until the vehicle does arrive.

Figure 17:
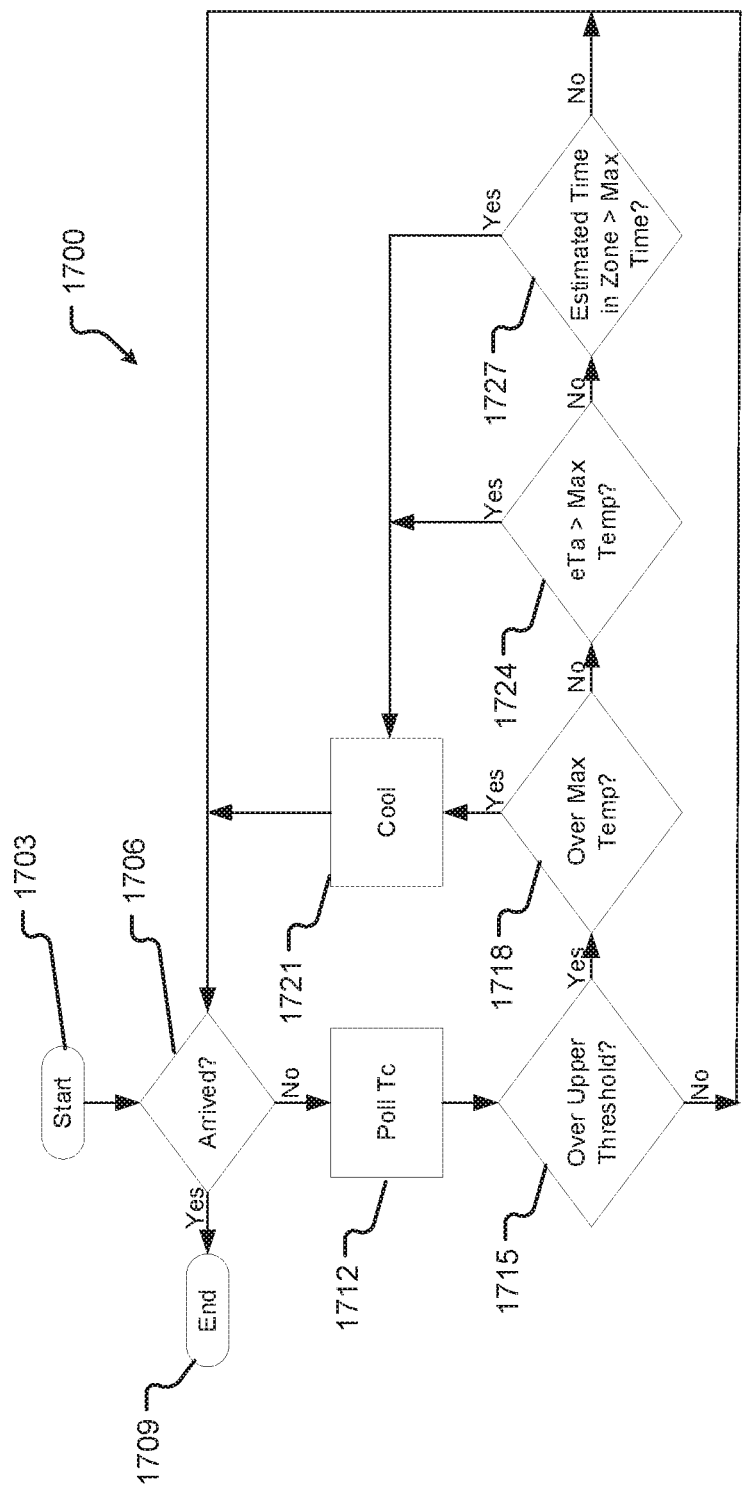
FIG. 17 is a block diagram illustration of a method in accordance with one or more of the disclosed embodiments.

As illustrated in FIG. 17, a method 1700 of managing the temperature of a battery may further comprise tracking the amount of time the battery spends above an upper threshold temperature allowed for the battery. As described above with regards to FIG. 15, a thermal management system may perform a method of managing a cooling unit of a battery for a vehicle. At the start of the method 1700, the thermal management system of the vehicle may determine, or be aware of, the many data points which may be used in calculating an estimated temperature at arrival of the battery. The thermal management system may also determine, or be aware of, the maximum allowed temperature of the battery as well as the threshold temperature of the battery.

The method 1700 may begin by first determining if the vehicle has arrived at the destination in step 1706. If the vehicle has arrived, the method may end at step 1709, as the vehicle may be safely turned off. If the vehicle has not arrived, the method 1700 may proceed to a step 1712 of the thermal management system determining a current temperature of the battery. The thermal management system may determine the current temperature of the battery by polling a temperature sensor on the battery. The thermal management system may otherwise determine the current temperature of the battery in other ways.

The thermal management system, after polling the current temperature of the battery, may determine whether the current temperature of the battery is above the upper threshold temperature of the battery at step 1715. If the current temperature of the battery is not over the threshold temperature, the method 1700 may simply comprise returning to the step 1706 of determining whether the vehicle has arrived. As such, if the battery temperature is not over the upper threshold, the vehicle may simply continue driving without the cooling unit initiating.

If the current temperature of the battery is determined to be over the upper threshold, in step 1715, the method 1700 may comprise determining whether the current temperature of the battery is over the maximum temperature of the vehicle in step 1718. If the current temperature of the battery is over the maximum temperature of the vehicle, the method 1700 may comprise initiating the cooling of the battery in step 1721.

If, on the other hand, the battery temperature is above the threshold temperature and below the maximum temperature, the thermal management system may next determine whether the estimated temperature at arrival is above the maximum temperature in step 1724. If the estimated temperature at arrival is above the maximum temperature, the method may comprise initiating the cooling of the battery in step 1721 before returning to the step 1706 of determining if the vehicle has arrived.

If the battery temperature is above the upper threshold temperature and below the maximum temperature, but the estimated temperature at arrival of the battery is also below the maximum temperature, the thermal management system may determine an amount of time the battery has been above the threshold temperature in step 1727. The thermal management system may compare the determined amount of time the battery has been above the threshold temperature to a maximum amount of time the battery can be above the threshold temperature without sustaining damage. If the amount of time the battery has been above the threshold temperature is nearing the amount of time the battery can be above the threshold temperature, the thermal management system may initiate cooling of the battery in step 1721 such that the battery returns to at or below the upper threshold temperature prior to sustaining damage.

If, in step 1727, it is determined that the estimated time in the zone between the upper threshold and the maximum temperature is less than the maximum amount of time allowed, the method may comprise returning to the step 1706 of determining whether the vehicle has arrived. The method 1700 may continue in this loop until the vehicle has arrived.

Figure 18:
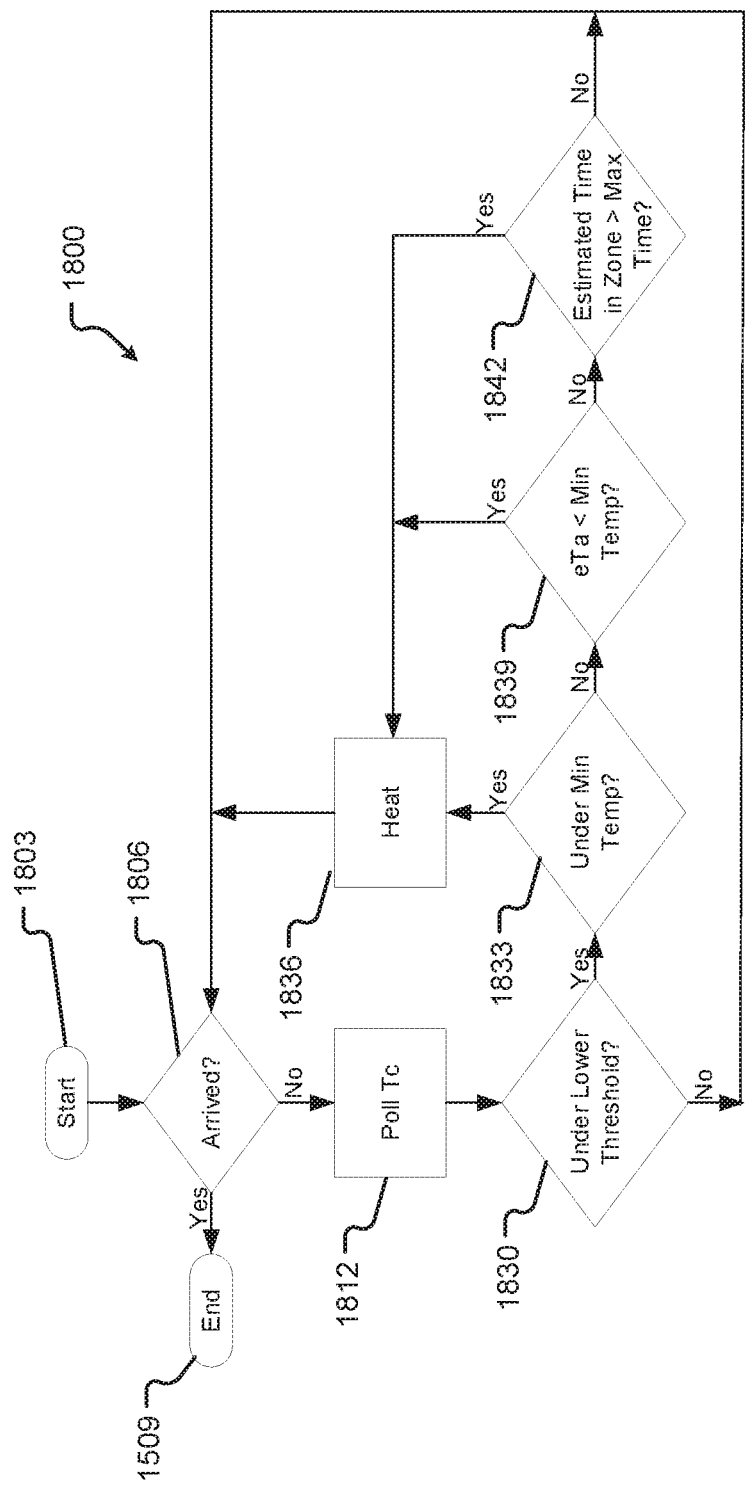
FIG. 18 is a block diagram illustration of a method in accordance with one or more of the disclosed embodiments.

As illustrated in FIG. 18, a method 1800 of managing the temperature of a battery may further comprise tracking the amount of time the battery spends below a lower threshold temperature allowed for the battery. As described above with regards to FIG. 16, a thermal management system may perform a method of managing a heating unit of a battery for a vehicle. At the start of the method 1800, the thermal management system of the vehicle may determine, or be aware of, the many data points which may be used in calculating an estimated temperature at arrival of the battery. The thermal management system may also determine, or be aware of, the minimum allowed temperature of the battery as well as a lower threshold temperature of the battery.

The method 1800 may begin by first determining if the vehicle has arrived at the destination at step 1806. If the vehicle has arrived, the method may end, as the vehicle may be safely turned off at step 1809. If the vehicle has not arrived, the method 1800 may proceed to a step 1812 of the thermal management system determining a current temperature of the battery. The thermal management system may determine the current temperature of the battery by polling a temperature sensor on the battery. The thermal management system may otherwise determine the current temperature of the battery in other ways.

The thermal management system, after polling the current temperature of the battery, may determine whether the current temperature of the battery is under the lower threshold temperature of the battery in step 1830. If the current temperature of the battery is not under the lower threshold temperature, the method 1800 may simply comprise returning to the step 1806 of determining whether the vehicle has arrived. As such, if the battery temperature is above the lower threshold, the vehicle may simply continue driving without the heating unit initiating.

If the current temperature of the battery is determined to be below the lower threshold, in step 1830, the method 1800 may comprise determining whether the current temperature of the battery is under the minimum temperature of the vehicle in step 1833. If the current temperature of the battery is under the minimum temperature of the vehicle, the method 1600 may comprise initiating the heating of the battery in step 1836.

If, on the other hand, the battery temperature is below the lower threshold temperature and above the minimum temperature, the thermal management system may next determine whether the estimated temperature at arrival is below the minimum temperature in step 1839. If the estimated temperature at arrival is below the minimum temperature, the method 1800 may comprise initiating the heating of the battery in step 1836 and returning to the step 1806 of determining if the vehicle has arrived.

If the battery temperature is below the lower threshold temperature and above the minimum temperature, but the estimated temperature at arrival of the battery is above the minimum temperature, the thermal management system may determine an amount of time the battery has been below the lower threshold temperature in step 1842. The thermal management system may compare the determined amount of time the battery has been below the lower threshold temperature to a maximum amount of time the battery can be below the lower threshold temperature without sustaining damage. If the amount of time the battery has been below the lower threshold temperature is nearing the amount of time the battery can be below the lower threshold temperature, the thermal management system may initiate heating of the battery such that the battery returns to the lower threshold temperature prior to sustaining damage.

If, in step 1842, it is determined that the estimated time in the zone between the upper threshold and the maximum temperature is less than the maximum amount of time allowed, the method may comprise returning to the step 1806 of determining whether the vehicle has arrived. The method 1800 may continue in this loop until the vehicle has arrived.

Figure 19:
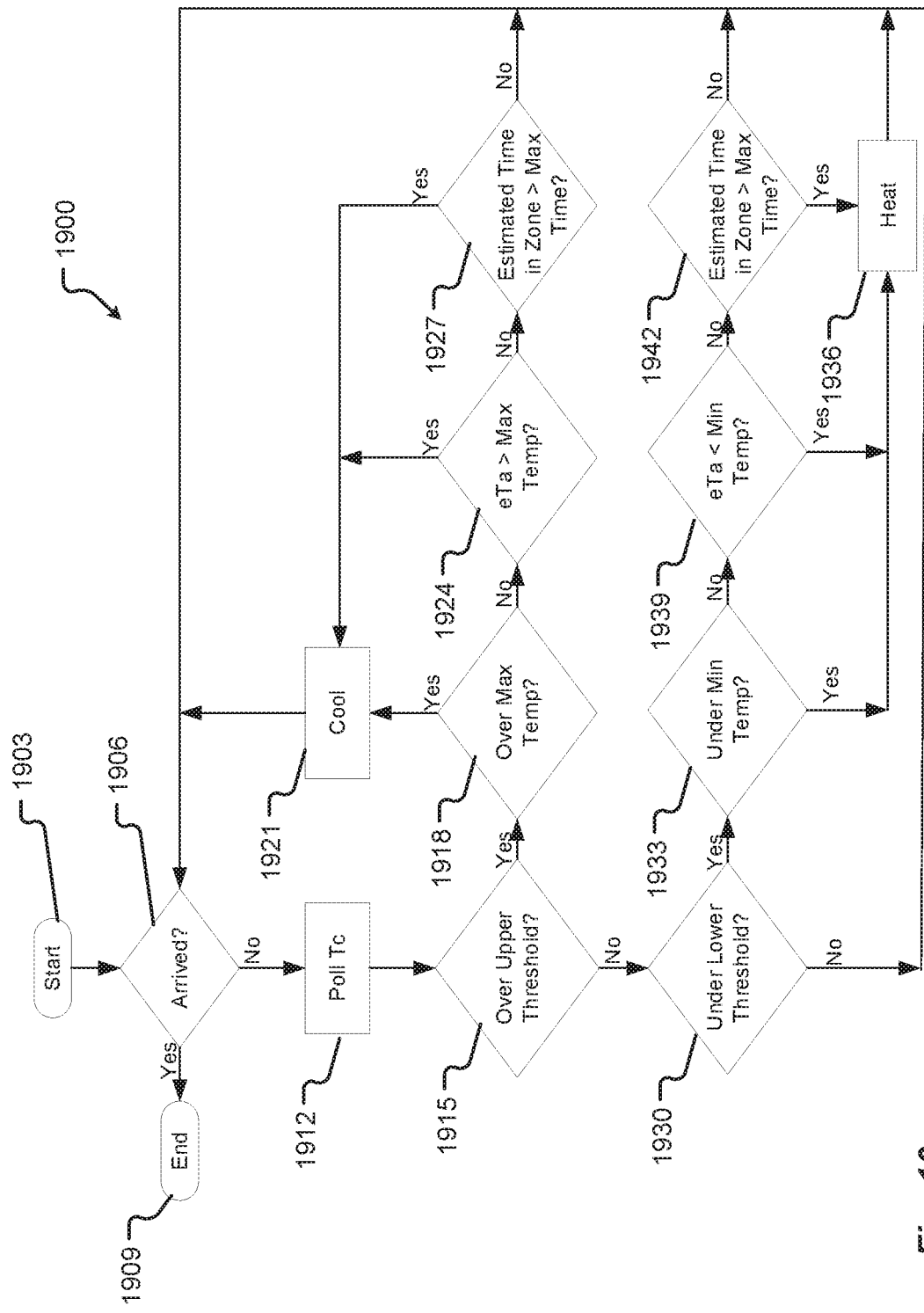
FIG. 19 is a block diagram illustration of a method in accordance with one or more of the disclosed embodiments.

As illustrated in FIG. 19, a method 1900 of managing the temperature of a battery may comprise managing both heating and cooling of a battery as well as tracking the amount of time the battery spends above an upper threshold temperature and/or below a lower threshold temperature allowed for the battery. At the start 1903 of the method 1900, the thermal management system of the vehicle may determine, or be aware of, the many data points which may be used in calculating an estimated temperature at arrival of the battery. The thermal management system may also determine, or be aware of, the maximum and/or minimum allowed temperatures of the battery as well as upper and lower threshold temperatures of the battery.

The method 1900 may begin by first determining if the vehicle has arrived at the destination at step 1906. If the vehicle has arrived, the method 1900 may end at step 1909, as the vehicle may be safely turned off. If the vehicle has not arrived, the method 1900 may proceed to a step 1912 of the thermal management system determining a current temperature of the battery. The thermal management system may determine the current temperature of the battery by polling a temperature sensor on the battery. The thermal management system may otherwise determine the current temperature of the battery in other ways.

The thermal management system, after polling the current temperature of the battery, may determine whether the current temperature of the battery is above the threshold temperature of the battery in step 1915. If the current temperature of the battery is not above the threshold temperature, the method may comprise determining whether the temperature of the battery is below the lower threshold temperature for the battery in step 1930. If the battery temperature is neither above the upper threshold temperature or below the lower threshold temperature, the vehicle may simply continue driving without the cooling or heating unit initiating and the method may return to step 1906.

If the current temperature of the battery is determined to be over the upper threshold, in step 1915, the method 1900 may comprise determining whether the current temperature of the battery is over the maximum temperature of the vehicle in step 1918. If the current temperature of the battery is over the maximum temperature of the vehicle, the method 1900 may comprise initiating the cooling of the battery in step 1921.

If, on the other hand, the battery temperature is above the upper threshold temperature and below the maximum temperature, the thermal management system may next determine whether the estimated temperature at arrival is above the maximum temperature in step 1924. If the estimated temperature at arrival is above the maximum temperature, the method 1900 may comprise initiating the cooling of the battery in step 1921 before returning to the step 1906 of determining if the vehicle has arrived.

If the battery temperature is above the upper threshold temperature and below the maximum temperature, but the estimated temperature at arrival of the battery is below the maximum temperature, the thermal management system may determine an amount of time the battery has been above the threshold temperature in step 1927. The thermal management system may compare the determined amount of time the battery has been above the threshold temperature to a maximum amount of time the battery can be above the threshold temperature without sustaining damage. If the amount of time the battery has been above the threshold temperature is nearing the amount of time the battery can be above the threshold temperature, the thermal management system may initiate cooling of the battery in step 1921 such that the battery returns to the upper threshold temperature prior to sustaining damage.

If, in step 1927, it is determined that the estimated time in the zone between the upper threshold and the maximum temperature is less than the maximum amount of time allowed, the method may comprise returning to the step 1906 of determining whether the vehicle has arrived. The method 1900 may continue in this loop until the vehicle has arrived.

If it is determined, in step 1930, that the current temperature of the battery is above the lower threshold temperature, the method 1900 may simply comprise returning to the step of determining whether the vehicle has arrived. As such, if the battery temperature is above the lower threshold and below the upper threshold, the vehicle may simply continue driving without the heating and/or cooling unit initiating.

If the current temperature of the battery is determined to be below the lower threshold, in step 1930, the method 1900 may comprise determining whether the current temperature of the battery is under the minimum temperature of the vehicle in step 1933. If the current temperature of the battery is under the minimum temperature of the vehicle, the method 1900 may comprise initiating the heating of the battery in step 1936.

If, on the other hand, the battery temperature is below the lower threshold temperature and above the minimum temperature, the thermal management system may next determine whether the estimated temperature at arrival is below the minimum temperature at step 1939. If the estimated temperature at arrival is below the maximum temperature, the method 1900 may comprise initiating the heating of the battery in step 1936 and returning to the step 1906 of determining whether the vehicle has arrived.

If the battery temperature is below the lower threshold temperature and above the minimum temperature, but the estimated temperature at arrival of the battery is above the minimum temperature, the thermal management system may determine an amount of time the battery has been below the lower threshold temperature in step 1942. The thermal management system may compare the determined amount of time the battery has been below the lower threshold temperature to a maximum amount of time the battery can be below the lower threshold temperature without sustaining damage. If the amount of time the battery has been below the lower threshold temperature is nearing the amount of time the battery can be below the lower threshold temperature, the thermal management system may initiate heating of the battery such that the battery returns to the lower threshold temperature prior to sustaining damage.

If, in step 1942, it is determined that the estimated time in the zone between the upper threshold and the maximum temperature is less than the maximum amount of time allowed, the method may comprise returning to the step

1906 of determining whether the vehicle has arrived. The method 1900 may continue in this loop until the vehicle has arrived.

The exemplary systems and methods of this invention have been described in relation to a battery of an electric vehicle. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example, in one alternative embodiment, the data stream reference module is applied with other types of data structures, such as object oriented and relational databases.

In another alternative embodiment, the data stream reference module is applied in architectures other than contact centers, such as workflow distribution systems.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

Embodiments include a system comprising: a processor; and a memory coupled to the processor and comprising computer-readable program code that when executed by the processor causes the processor to perform operations comprising: determining a current temperature of a battery of a vehicle; and determining if the current temperature of the battery is within a threshold temperature range of the battery, wherein if the processor determines the current temperature of the battery is within a threshold temperature range of the battery, the processor performs operations comprising: determining an estimated temperature at arrival of the battery; and determining if the estimated temperature at arrival of the battery is within the threshold temperature range of the battery, wherein if the processor determines the estimated temperature at arrival of the battery exceeds a maximum or minimum temperature of the battery, the processor performs an operation of initiating a thermal management process.

Aspects of the above system include wherein if the estimated temperature at arrival of the battery is within the threshold temperature range of the battery, the processor performs operations comprising: determining an amount of time the vehicle will be within the threshold temperature range of the battery; and determining if the amount of time the vehicle will be within the threshold temperature range of the battery exceeds a maximum amount of time within the threshold temperature range of the battery, wherein if the processor determines the amount of time the vehicle will be within the threshold temperature range of the battery exceeds a maximum amount of time within the threshold temperature range of the battery, the processor initiates the thermal management process.

Aspects of the above system include wherein if the processor determines the current temperature of the battery is not within the threshold temperature range of the battery, the processor performs an operation comprising determining if the vehicle has arrived, wherein if the processor determines the vehicle has not arrived, the processor instructs the vehicle to drive without initiating the thermal management process.

Aspects of the above system include wherein the thermal management process comprises cooling the battery.

Aspects of the above system include wherein the thermal management process comprises heating the battery.

Aspects of the above system include wherein determining the estimated temperature at arrival of the battery is based on one or more data points associated with a current operating scenario.

Aspects of the above system include wherein one or more of the one or more data points is obtained by the processor from a network location external to the vehicle.

Aspects of the above system include wherein one or more of the one or more data points is obtained by the processor from a vehicle navigation system.

Aspects of the above system include wherein determining the estimated temperature at arrival of the battery is based on historical usage of the vehicle.

Aspects of the above system include wherein determining the estimated temperature at arrival of the battery is based on weather information associated with a route of the vehicle.

Embodiments include a method comprising: performing operations on a processor of a vehicle, the operations comprising: determining a current temperature of a battery of the vehicle; and determining if the current temperature of the battery is within a threshold temperature range of the battery, wherein if the processor determines the current temperature of the battery is within a threshold temperature range of the battery, the processor performs operations comprising: determining an estimated temperature at arrival of the battery; and determining if the estimated temperature at arrival of the battery is within the threshold temperature range of the battery, wherein if the processor determines the estimated temperature at arrival of the battery exceeds a maximum or minimum temperature of the battery, the processor performs an operation of initiating a thermal management process.

Aspects of the above method include wherein if the estimated temperature at arrival of the battery is within the threshold temperature range of the battery, the processor performs operations comprising: determining an amount of time the vehicle will be within the threshold temperature range of the battery; and determining if the amount of time the vehicle will be within the threshold temperature range of the battery exceeds a maximum amount of time within the threshold temperature range of the battery, wherein if the processor determines the amount of time the vehicle will be within the threshold temperature range of the battery exceeds a maximum amount of time within the threshold temperature range of the battery, the processor initiates the thermal management process.

Aspects of the above method include wherein if the processor determines the current temperature of the battery is not within the threshold temperature range of the battery, the processor performs an operation comprising determining if the vehicle has arrived, wherein if the processor determines the vehicle has not arrived, the processor instructs the vehicle to drive without initiating the thermal management process.

Aspects of the above method include wherein the thermal management process comprises cooling the battery.

Aspects of the above method include wherein the thermal management process comprises heating the battery.

Aspects of the above method include wherein determining the estimated temperature at arrival of the battery is based on one or more data points associated with a current operating scenario.

Aspects of the above method include wherein one or more of the one or more data points is obtained by the processor from a network location external to the vehicle.

Aspects of the above method include wherein one or more of the one or more data points is obtained by the processor from a vehicle navigation system.

Aspects of the above method include wherein determining the estimated temperature at arrival of the battery is based on historical usage of the vehicle.

Embodiments include a computer program product comprising: a non-transitory computer-readable storage medium having computer-readable program code embodied therewith, the computer-readable program code configured, when executed by a processor, to: determine a current temperature of a battery of a vehicle; and determine if the current temperature of the battery is within a threshold temperature range of the battery, wherein if the processor determines the current temperature of the battery is within a threshold temperature range of the battery, the processor performs operations comprising: determining an estimated temperature at arrival of the battery; and determining if the estimated temperature at arrival of the battery is within the threshold temperature range of the battery, wherein if the processor determines the estimated temperature at arrival of the battery exceeds a maximum or minimum temperature of the battery, the processor performs an operation of initiating a thermal management process.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a processor; and
   a memory coupled to the processor and comprising computer-readable program code that when executed by the processor causes the processor to perform operations comprising:
   determining a current temperature of a battery of a vehicle;
   determining that the current temperature of the battery is within a threshold temperature range of the battery; and
   in response to determining that the current temperature of the battery is within the threshold temperature range of the battery, performing operations comprising:
   determining an estimated temperature at arrival of the battery;
   determining that the estimated temperature at arrival of the battery is within the threshold temperature range of the battery;
   determining an amount of time that the vehicle will be within the threshold temperature range of the battery;
   determining that the amount of time the vehicle will be within the threshold temperature range of the battery exceeds a maximum amount of time within the threshold temperature range of the battery; and
   in response to determining that the amount of time the vehicle will be within the threshold temperature range of the battery exceeds the maximum amount of time within the threshold temperature range of the battery, initiating a thermal management process.

2. The system of claim 1, further comprising determining the current temperature of the battery is not within the threshold temperature range of the battery, determining the vehicle has not arrived, and in response to determining the vehicle has not arrived, instructing the vehicle to drive without initiating the thermal management process.

3. The system of claim 1, further comprising determining the estimated temperature at arrival of the battery exceeds a maximum temperature of the battery, and cooling the battery in response to determining the estimated temperature at arrival of the battery exceeds the maximum temperature of the battery.

4. The system of claim 1, further comprising determining the estimated temperature at arrival of the battery is less than a minimum temperature of the battery, and heating the battery in response to determining the estimated temperature at arrival of the battery is less the minimum temperature of the battery.

5. The system of claim 1, wherein the estimated temperature at arrival of the battery is determined based on historical usage of the vehicle.

6. The system of claim 1, wherein the estimated temperature at arrival of the battery is determined based on weather information associated with a route of the vehicle.

7. The system of claim 1, wherein the estimated temperature at arrival of the battery is determined based on one or more data points associated with a current operating scenario.

8. The system of claim 7, wherein the one or more data points are obtained by the processor from a network location external to the vehicle.

9. The system of claim 7, wherein one or more of the one or more data points are obtained by the processor from a vehicle navigation system.

10. A method comprising:
    performing operations on a processor of a vehicle, the operations comprising:
    determining a current temperature of a battery of the vehicle;
    determining that the current temperature of the battery is within a threshold temperature range of the battery; and
    in response to determining that the current temperature of the battery is within the threshold temperature range of the battery, the processor performs operations comprising:
    determining an estimated temperature at arrival of the battery;
    determining that the estimated temperature at arrival of the battery is within the threshold temperature range of the battery, battery;
    determining an amount of time the vehicle will be within the threshold temperature range of the battery;

determining that the amount of time the vehicle will be within the threshold temperature range of the battery exceeds a maximum amount of time within the threshold temperature range of the battery; and in response to determining that the amount of time the vehicle will be within the threshold temperature range of the battery exceeds the maximum amount of time within the threshold temperature range of the battery, initiating a thermal management process.

11. The method of claim 10, further comprising determining the current temperature of the battery is not within the threshold temperature range of the battery, determining the vehicle has not arrived, and in response to determining the vehicle has not arrived, instructing the vehicle to drive without initiating the thermal management process.

12. The method of claim 10, further comprising determining the estimated temperature at arrival of the battery exceeds a maximum temperature of the battery, and cooling the battery in response to determining the estimated temperature at arrival of the battery exceeds the maximum temperature of the battery.

13. The method of claim 10, further comprising determining the estimated temperature at arrival of the battery is less than a minimum temperature of the battery, and heating the battery in response to determining the estimated temperature at arrival of the battery is less the minimum temperature of the battery.

14. The method of claim 10, wherein the estimated temperature at arrival of the battery is determined based on historical usage of the vehicle.

15. The method of claim 10, wherein the estimated temperature at arrival of the battery is determined based on one or more data points associated with a current operating scenario.

16. The method of claim 15, wherein the one or more data points are obtained by the processor from a network location external to the vehicle.

17. The method of claim 15, wherein the one or more data points are obtained by the processor from a vehicle navigation system.

18. A non-transitory computer-readable storage medium having computer-readable program code embodied therewith, the computer-readable program code configured, when executed by a processor, to:

determine a current temperature of a battery of a vehicle;

determine if the current temperature of the battery is within a threshold temperature range of the battery; and in response to determining that the current temperature of the battery is within the threshold temperature range of the battery, the processor performs operations comprising:

determining an estimated temperature at arrival of the battery;

determining that the estimated temperature at arrival of the battery is within the threshold temperature range of the battery;

determining an amount of time that the vehicle will be within the threshold temperature range of the battery;

determining that the amount of time that the vehicle will be within the threshold temperature range of the battery exceeds a maximum amount of time within the threshold temperature range of the battery; and in response to determining that the amount of time that the vehicle will be within the threshold temperature range of the battery exceeds the maximum amount of time within the threshold temperature range of the battery, initiating a thermal management process.

19. The computer-readable storage medium of claim 18, wherein the estimated temperature at arrival of the battery is determined based on one or more data points associated with a current operating scenario.

20. The computer-readable storage medium of claim 19, wherein the one or more data points are obtained by the processor from a network location external to the vehicle.

* * * * *

UNITED STATES PATENT AND TRADEMARK OFFICE
CERTIFICATE OF CORRECTION

PATENT NO. : 10,870,368 B2
APPLICATION NO. : 15/954286
DATED : December 22, 2020
INVENTOR(S) : Adam H. Ing et al.

Page 1 of 1

It is certified that error appears in the above-identified patent and that said Letters Patent is hereby corrected as shown below:

In the Claims

Claim 10, Column 44, Line 64, delete "of the battery, battery;" and insert --of the battery;-- therein.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*